(12) United States Patent
Asakura et al.

(10) Patent No.: US 8,263,219 B2
(45) Date of Patent: Sep. 11, 2012

(54) OPTICAL FILM, POLARIZING PLATE, AND IMAGE DISPLAY

(75) Inventors: Tetsuya Asakura, Minami-Ashigara (JP); Masaaki Suzuki, Minami-Ashigara (JP); Katsumi Inoue, Minami-Ashigara (JP); Ryuji Saneto, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 785 days.

(21) Appl. No.: 12/343,933

(22) Filed: Dec. 24, 2008

(65) Prior Publication Data

US 2009/0168173 A1 Jul. 2, 2009

(30) Foreign Application Priority Data

Dec. 26, 2007 (JP) ................ P2007-334793

(51) Int. Cl.
  *B32B 5/16* (2006.01)
  *B32B 19/02* (2006.01)
  *G02B 5/02* (2006.01)
  *G02B 13/20* (2006.01)

(52) U.S. Cl. ........ 428/327; 428/323; 428/336; 428/339; 359/599

(58) Field of Classification Search ............. 428/323
See application file for complete search history.

(56) References Cited

U.S. PATENT DOCUMENTS

| 7,963,660 | B2 * | 6/2011 | Hamamoto et al. .......... 359/601 |
| 2005/0152034 | A1 * | 7/2005 | Matsunaga .................. 359/493 |
| 2007/0030430 | A1 * | 2/2007 | Inoue et al. .................. 349/137 |
| 2007/0139781 | A1 * | 6/2007 | Inoue et al. .................. 359/599 |
| 2007/0195431 | A1 | 8/2007 | Asakura et al. |
| 2009/0086326 | A1 | 4/2009 | Hamamoto et al. |

FOREIGN PATENT DOCUMENTS

| JP | 2007-041533 A | 2/2007 |
| WO | WO 2007/000856 A1 | 1/2007 |

* cited by examiner

*Primary Examiner* — Randy Gulakowski
*Assistant Examiner* — Mike M Dollinger
(74) *Attorney, Agent, or Firm* — Birch, Stewart, Kolasch & Birch, LLP (57) ABSTRACT

Provided is an optical film including a transparent support; and an antiglare layer that comprises a light-transmitting resin and at least two kinds of light-transmitting particles, wherein the antiglare layer has a thickness of from 10 μm to 15 μm, each kind of the at least two kinds of light transmitting particles has an average particle size of from 7 μm to 15 μm, each kind of the at least two kinds of light transmitting particles has a refractive index different from a refractive index of the light-transmitting resin by from 0.001 to 0.050 in absolute value, and a total amount of the at least two kinds of light-transmitting particles are from 15 to 40 mass % based on all solid contents in the antiglare layer.

15 Claims, 1 Drawing Sheet

OPTICAL FILM, POLARIZING PLATE, AND IMAGE DISPLAY

BACKGROUND OF THE INVENTION

1. Field of the Invention

The present invention relates to an optical film, a polarizing plate having the optical film, and an image display.

2. Description of the Related Art

In various kinds of image displays, such as a liquid crystal display (LCD), a plasma display panel (PDP), electroluminescence display (ELD), and a cathode ray tube display (CRT), antiglare films and antiglare antireflection films are used on the surfaces of displays for the purpose of prevention of reduction of contrast due to the reflection of outer light and mirroring of images. With the spread of use of image displays in offices and homes, the improvement of antiglare to prevent the light of a fluorescent lamp in room and the image of a viewer from being mirrored on the surfaces of displays, and further improvement of the contrast of display in bright places are required.

An antiglare film, which has ruggedness on the surface for the purpose of making light scatter to obtain an antiglare property, has a problem of the reduction of image quality, i.e., denseness of black is low at a bright place due to light scattering on the surface, therefore it has been an object to reconcile an antiglare property and denseness of black. As a means for improving this problem, an antiglare film having a thickness of from 15 to 35 μm containing fine particles having an average particle size of from 6 to 15 μm is proposed (for example, refer to JP-A-2007-41533 (The term "JP-A" as used herein refers to an "unexamined published Japanese patent application".)).

However, there is a case where the antiglare film disclosed in JP-A-2007-41533 having a film thickness as thick as 15 to 35 μm is accompanied by cracking or large curling by bending at the time of processing of a polarizing plate and the like. In addition, when the antiglare film disclosed in JP-A-2007-41533 is used on the surface of a liquid crystal display (LCD), if the light of a three band fluorescent lamp is mirrored on the surface of the display, rainbow color irregularity is sometimes seen around the mirrored light of the fluorescent lamp, or there are cases where irregularity attributable to the image display part is seen, and the improvement of these phenomena is desired.

SUMMARY OF THE INVENTION

An object of the invention is to provide an antiglare film excellent in an antiglare property, denseness of black, and resistance to brittleness, and rainbow color irregularity around a mirrored image and irregularity due to the image display part are hardly seen. Another object of the invention is to provide a polarizing plate and an image display equipped with the optical film.

As a result of earnest examinations, the present inventors have found that an antiglare film excellent in an antiglare property, denseness of black, and resistance to brittleness can be manufactured with good reproducibility by the use in combination of particles having a specific particle size and a specific refractive index, the specific amount of the particles, and a film thickness, thus the invention has been accomplished. It has also been found that, when the antiglare film of the invention is used on the surface of a liquid crystal display (LCD), rainbow color irregularity is difficult to occur even when the light of a three-band fluorescent lamp is mirrored on the surface of the display.

That is, the present inventors have achieved the above objects by each of the following structures.

1. An optical film comprising:
   a transparent support; and
   an antiglare layer that comprises a light-transmitting resin and at least two kinds of light-transmitting particles,
   wherein
   the antiglare layer has a thickness of from 10 μm to 15 μm,
   each kind of the at least two kinds of light transmitting particles has an average particle size of from 7 μm to 15 μm,
   each kind of the at least two kinds of light transmitting particles has a refractive index different from a refractive index of the light-transmitting resin by from 0.001 to 0.050 in absolute value, and
   a total amount of the at least two kinds of light-transmitting particles are from 15 to 40 mass % based on all solid contents in the antiglare layer.

2. The optical film as described in 1, wherein
   the refractive indices of the at least two kinds of light-transmitting particles are different from each other.

3. The optical film as described in 2, wherein
   the at least two kinds of light-transmitting particles comprise:
   a light-transmitting particle A having a refractive index different from the refractive index of the light-transmitting resin by from 0.010 to 0.050; and
   a light-transmitting particle B having a refractive index different from the refractive index of the light-transmitting resin by from −0.050 to −0.010.

4. The optical film as described in 2, wherein
   the at least two kinds of light-transmitting particles comprise:
   a light-transmitting particle A having a refractive index different from the refractive index of the light-transmitting resin by from 0.015 to 0.050 in absolute value; and
   a light-transmitting particle B having a refractive index different from the refractive index of the light-transmitting resin by 0.001 or more and less than 0.015 in absolute value.

5. The optical film as described in 3, wherein
   an average particle size of light-transmitting particle A is substantially the same as an average particle size of light-transmitting particle B.

6. The optical film as described in 4, wherein
   an average particle size of the light-transmitting particle A is different from an average particle size of the light-transmitting particle B.

7. The optical film as described in any of 3 to 6, wherein
   a mass ratio of the light-transmitting particle A to the light-transmitting particle B is from 25/75 to 75/25.

8. The optical film as described in any of 1 to 7, further comprising:
   a layer having a refractive index lower than a refractive index of the antiglare layer.

9. The optical film as described in any of 1 to 8, wherein
   a haze value attributable to surface scattering is from 0.2% to 10%.

10. The optical film as described in any of 1 to 9, wherein a haze value attributable to internal scattering is from 10% to 35%.

11. The optical film as described in any of 1 to 10, wherein an integrated reflectance is 3.0% or less.

12. The optical film as described in any of 1 to 11, wherein a centerline average roughness Ra is from 0.05 to 0.25 μm, and
    an average space of ruggedness Sm is from 50 to 350 μm.

13. The optical film as described in any of 1 to 12, wherein an average inclination angle θa is 0.5° or more and 3.0° or less.
14. The optical film as described in any of 1 to 13, wherein the largest angle of distribution of inclination angle is 0.30 or less.
15. A polarizing plate comprising:
    a polarizing film; and
    two protective films that protect both surfaces of the polarizing film,
    wherein at least one of the two protective films is the optical film as described in any of 1 to 14.
16. An image display comprising:
    the optical film as described in any of 1 to 14 or the polarizing plate as described in 15.

DETAILED DESCRIPTION OF THE INVENTION

The invention will be described in further detail below. Incidentally, in the specification of the invention, when numerical values represent physical values and characteristic values, the description "from (numerical value 1) to (numerical value 2)" means "(numerical value 1) or more and (numerical value 2) or less". Further, "(meth)acrylate" means "at least either acrylate or methacrylate", and this also applies to "(meth)acrylic acid".

Layer Structure of Optical Film:

The optical film according to the invention is an optical film comprising a transparent support having thereon an antiglare layer, and the antiglare layer has a light-transmitting resin constituting the antiglare layer and at least two kinds of light-transmitting particles, the thickness of the antiglare layer is from 10 to 15 μm, the average particle size of these plurality of light-transmitting particles is from 7 to 15 μm, the absolute values of the difference in refractive index between these plurality of light-transmitting particles and the light-transmitting resin are respectively in the range of from 0.001 to 0.050, and these plurality of light-transmitting particles are contained from 15 to 40 mass % in total based on all the solids content in the antiglare layer.

The optical film according to the invention has at least one antiglare layer on a transparent support. The antiglare layer is a layer having a light scattering function using surface scattering, or internal scattering, or both of these scatterings. The antiglare layer may consist of one layer, or may comprise a plurality of layers, e.g., from two to four layers.

The examples of preferred layer structures of optical films in the invention are shown below. In the following structures, a substrate film means a transparent support consisting of a film.

A substrate film/an antiglare layer
A substrate film/an antistatic layer/an antiglare layer
A substrate film/an antiglare layer/a low refractive index layer
A substrate film/an antiglare layer/an antistatic layer/a low refractive index layer
A substrate film/a hard coat layer/an antiglare layer/a low refractive index layer
A substrate film/a hard coat layer/an antiglare layer/an antistatic layer/a low refractive index layer
A substrate film/a hard coat layer/an antistatic layer/an antiglare layer/a low refractive index layer
A substrate film/an antiglare layer/a high refractive index layer/a low refractive index layer
A substrate film/an antiglare layer/a medium refractive index layer/a high refractive index layer/a low refractive index layer
An antistatic layer/a substrate film/an antiglare layer/a medium refractive index layer/a high refractive index layer/a low refractive index layer
A substrate film/an antistatic layer/an antiglare layer/a medium refractive index layer/a high refractive index layer/a low refractive index layer
An antistatic layer/a substrate film/an antiglare layer/a high refractive index layer/a low refractive index layer/a high refractive index layer/a low refractive index layer In the optical film according to the invention, layers other than an antiglare layer may be coated. As such layers, e.g., a hard coat layer, an antistatic layer, a low refractive index layer, and an antifouling layer are exemplified. It is more preferred for an antiglare layer to have functions of a hard coat layer, an antistatic layer, an antifouling layer, and the like, at the same time. It is preferred that at least one layer of the medium refractive index layer and the high refractive index layer in the above layer structures unites the function of an antistatic layer. In the case of a three-layer structure of a medium refractive index layer/a high refractive index layer/a low refractive index layer, it is especially preferred for the medium refractive index layer to unite the function of an antistatic layer in view of the realization of desired antistatic property and refractive index.

In the invention, from the aspect of decrease in reflection, antireflection films including the structure of a medium refractive index layer/a high refractive index layer/a low refractive index layer are preferred. For example, the structures disclosed in JP-A-8-122504, JP-A-8-110401, JP-A-10-300902, JP-A-2002-243906 and JP-A-2000-111706 are exemplified.

From the viewpoint of easy manufacture and high productivity, preferred embodiments in the invention are an optical film comprising a transparent support having thereon a single layer antiglare layer, and an antireflection film comprising a support having thereon a single layer antiglare layer and a single layer low refractive index layer in this order.

Structure of Antiglare Layer:

The antiglare layer in the optical film in the invention contains at least two kinds of light-transmitting particles having an average particle size of from 7 to 15 μm, and a light-transmitting resin. The antiglare layer can be formed by coating a coating solution containing the light-transmitting particles, components for forming a matrix (monomers for a binder and the like), and an organic solvent, and then drying and hardening the coated solution.

The coating solution for forming the antiglare layer contains the monomers for a main matrix-forming binder that is the raw material of a light-transmitting polymer formed by curing by irradiation with ionizing radiation and the like, the light-transmitting particles having a specific particle size, and a polymerization initiator, and the coating solution may further contain a polymer compound for regulating the viscosity of the coating solution, an inorganic fine particle filler for the prevention of curling and adjustment of the refractive index, and coating aids, etc.

The thickness of the antiglare layer is preferably from 10 to 15 μm, more preferably from 12 to 15 μm, and most preferably from 13 to 14 μm. When the thickness is less than 10 μm, the surface ruggedness becomes too large and denseness of black deteriorates when light-transmitting particles described later are used, while when it exceeds 15 μm, surface ruggedness becomes too small and an antiglare property is insufficient, and resistance to brittleness of the film worsens.

Light-Transmitting Particles for Antiglare Layer:

The average particle size of the light-transmitting particles is preferably from 7 to 15 μm, more preferably from 7.5 to 12 μm, and still more preferably from 8 to 12 μm. When the particle size is in this range, excellent antiglare property and denseness of black are secured.

In the invention, as the light-transmitting particles, at least two kinds of particles are used from the viewpoint of light scattering as described later. It is preferred that at least either the average particle size or the refractive index of at least two kinds of light-transmitting particles is different from each other. It is a preferred embodiment to contain two kinds of particles alone (e.g., particles A and particles B), but additional particles can be contained. For example, either one of particles A and particles B and particles C having the same particle size can be contained.

In the invention, the content of the light-transmitting particles is from 15 to 40 mass % of all the solids content in the antiglare layer, preferably from 15 to 25 mass %, and more preferably from 15 to 20 mass %. When the content of the particles are in this range, an optical film excellent in an antiglare property and film strength is obtained.

Further, the mass ratio of particles A and particles B is preferably from 25/75 to 75/25, more preferably from 37/63 to 75/25, and still more preferably from 50/50 to 75/25.

In the invention, the light-transmitting particles are dispersed in a coating solution for forming an antiglare layer, and an antiglare layer is formed through coating, drying and curing. The average particle size of the light-transmitting particles means a primary particle size both at the time when two or more particles are present contiguously in a coated film and also when particles are present independently. However, when flocculating inorganic particles having a primary particle size of 0.1 μm or so are dispersed in a coating solution as secondary particles in a size to satisfy the particle size of the invention, and then coated, the average particle size is taken as the size of secondary particles.

It is preferred that the average particle sizes of particles A and particles B are substantially the same. "Substantially the same" means that the ratio of the average particle size of particles A (φA) and the average particle size of particles B (φB) (φB/(φA) is preferably from 0.90 to 1.10, more preferably from 0.95 to 1.05, and especially preferably from 0.97 to 1.03. When the ratio of the average particle size is in the above range, surface shapes do not change, therefore preferred from the viewpoint of an antiglare property and denseness of black.

The effect of the invention can be achieved by independently controlling an internal scattering property and a surface scattering property.

The control of an internal scattering property and a surface scattering property will be described later. An internal scattering property is measured by a haze value attributable to internal scattering (hereinafter referred to as "internal haze") and a surface scattering property is measured by a haze value attributable to surface scattering (hereinafter referred to as "surface haze"), which can be confirmed.

In the invention, for obtaining a necessary internal scattering property, it is necessary to regulate refractive indices of the particles and the light-transmitting particles (matrix) of the antiglare layer. The absolute value of the difference in refractive index between the light-transmitting particles and the light-transmitting resin is preferably from 0.001 to 0.50, more preferably from 0.005 to 0.040, still more preferably from 0.015 to 0.040, and most preferably from 0.020 to 0.030.

When two or more kinds of particles are used, the difference in refractive index between particles A and particles B may be 0, but is preferably different.

When the difference in refractive index is too small, a quantity of particles are necessary for obtaining desired internal scattering, and film strength is deteriorated. When the difference in refractive indexes is too great, the effect to make the irregularity attributable to the image display part difficult to be seen cannot be obtained.

It is a preferred embodiment in the invention that either particles A or particles B has a refractive index lower than that of the matrix and either one is higher in refractive index than the matrix. For example, of particles A and particles B, high refractive index particles (taken as particles A) preferably have a refractive index higher than that of the light-transmitting resin by 0.010 to 0.050, more preferably by 0.020 to 0.040, and most preferably by 0.020 to 0.030. Low refractive index particles (taken as particles B) preferably have a refractive index lower than that of the light-transmitting resin by 0.010 to 0.050, more preferably by 0.020 to 0.040, and most preferably by 0.020 to 0.030. By the fact that there is difference in the refractive index between particles A and particles B, it becomes easy to control internal scattering and the surface shape. Further, by using particles A having refractive indices higher than that of the matrix and particles B having refractive indices lower than that of the matrix, when the film is used on the surface of a liquid crystal display (LCD), rainbow color irregularity and irregularity attributable to the image display part do not occur even if the light of a three band fluorescent lamp is mirrored on the surface of a display, which is an astonishing fact.

The cause of rainbow color irregularity is not clearly known, but it is presumably as follows. When the light of a three-band fluorescent lamp is mirrored on an image display in a dark room, internal reflected light reflected by the glass plate, polarizing plate, electric circuit, or black matrix in the image display (e.g., a liquid crystal display) occurs around specularly reflected image, which is thought to be the cause of rainbow color irregularity. Further, with respect to irregularity attributable to the image display part, a streak-like or concentric circular display irregularity in a gray and solid state is observed depending upon liquid image displays. The cause is not clearly known but it is presumed that the irregularity is caused by the interference of shade and shadow of backlight and black matrix respectively.

It is preferred that the average particle sizes of particles A and particles B are substantially the same. "Substantially the same" means that the ratio of the average particle size of particles A (φA) and the average particle size of particles B (φB) (φB/(φA) is from 0.90 to 1.10, preferably from 0.95 to 1.05, and especially preferably from 0.97 to 1.03. When the ratio of the average particle sizes is in the above range, the surface shape does not change and, therefore, it is preferred from the viewpoint of an antiglare property and denseness of black.

Further, as another embodiment, it is also preferred to take particles A having the absolute value of the difference in refractive index between particles A and the light-transmitting resin of from 0.015 to 0.050, and particles B having the absolute value of the difference in refractive index between particles B and the light transmitting resin of 0.001 or more and less than 0.015. In this case, the average particle sizes of particles A and particles B are preferably different from each other, and more preferably φA<φB. When particles A and particles B are in this relationship, even when the light of a three-band fluorescent lamp is mirrored on the image display surface, rainbow color irregularity does not occur, therefore, it is preferred from the viewpoint of an antiglare property and denseness of black.

Light-transmitting particles can be selected from the particles described below depending upon a desired refractive index and an average particle size. As light-transmitting particles, at least one of resin particles and inorganic fine particles are used in the invention.

As the specific examples of the resin particles, resin particles, such as crosslinked polymethyl methacrylate particles, crosslinked methyl methacrylate-styrene copolymer particles, crosslinked polystyrene particles, crosslinked methyl methacrylate-methyl acrylate copolymer particles, crosslinked acrylate-styrene copolymer particles, melamine-formaldehyde resin particles, and benzoguanamine-formaldehyde resin particles are preferably exemplified. Of these, crosslinked styrene particles, crosslinked polymethyl methacrylate particles, and crosslinked methyl methacrylate-styrene copolymer particles are preferred. Further, what are called surface-modified particles obtained by chemical bonding of compounds containing a fluorine atom, a silicon atom, a carboxyl group, a hydroxyl group, an amino group, a sulfonic acid group, or a phosphoric acid group to the surfaces of these resin particles, and particles obtained by bonding inorganic fine particles of a nano-size, e.g., silica and zirconia, to the surfaces of these resin particles are also preferably exemplified.

Further, as the light-transmitting particles, inorganic fine particles can also be used. As the specific examples of the inorganic fine particles, silica particles and alumina particles are preferably exemplified, and silica particles are especially preferably used.

When the refractive index of the matrix of the antiglare layer is made 1.54 or less, and particularly preferably 1.53 or less, from the viewpoint of making coating unevenness and interference irregularity inconspicuous or from manufacturing costs, crosslinked polymethyl methacrylate particles, crosslinked methyl methacrylate-styrene copolymer particles, or silica particles are preferably used in the invention as the light-transmitting particles. When crosslinked methyl methacrylate-styrene copolymer particles are used, it is preferred that the copolymerization ratio of styrene is 10% or more and 90% or less.

As the shapes of particles, any of spherical and amorphous can be used. In connection with particle size distribution, monodispersed particles are preferred from the control of a haze value and a diffusing property, and homogeneity of coated surface. The CV value indicating the uniformity of particle diameters is preferably 15% or less, more preferably 13% or less, and still more preferably 10% or less. Further, prescribing a particle having a particle size larger than an average particle size by 33% or more as a coarse particle, it is preferred for the coarse particles to account for 1% or less of all the particle number, more preferably 0.8% or less, and still more preferably 0.4% or less. When coarse particles are in excess, surface roughening is perceived as emphasized too much, and feeling of ruggedness worsens, so that not preferred.

When a particle smaller than an average particle size by 16% or more is prescribed as a fine particle, it is preferred for the fine particles to account for 10% or less of all the particle number, more preferably 6% or less, and still more preferably 4% or less. Particles having such particle size distribution can be obtained by classification after ordinary synthesizing reaction, and particles of more preferred distribution can be obtained by increasing the number of times of classifications or making the degree of classification stronger. It is preferred to use a method of air classification, centrifugal classification, precipitation classification, filtration classification, or electrostatic classification in the classification.

The particle size of light-transmitting particles can be measured by any optional measuring method so long as the method is a measuring method of a particle size. There are a method of measuring the particle size distribution of particles by a Coulter Counter method, converting the measured distribution to particle number distribution, and computing the particle size from the obtained particle number distribution, and a method of observing particles with a transmission electron microscope (from 500,000 to 2,000,000 magnifications), and taking the average value of 100 particles observed as an average particle size.

Incidentally, an average particle size measured with a Coulter Counter is used in the invention.

The refractive index of light-transmitting particles is measured as follows. Arbitrary two kinds of solvents different in a refractive index selected from methylene iodide, 1,2-dibromopropane, and n-hexane are mixed by changing the mixing ratio to change the refractive index, and light transmitting particles are dispersed in an equivalent amount in the solvents and turbidity is measured. The refractive index at the time when the turbidity becomes minimum is measured with an Abbe's refractometer as the refractive index of the light-transmitting particles.

Surface Shape:

It is necessary in the invention to reconcile a good antiglare property and denseness of black. In connection with the antiglare property, it is necessary in practical use to show a good antiglare property in cases where various light sources are mirrored from various angles. As a result of earnest examinations by the present inventors, it has been found that such a diversity of mirroring can be simply estimated by changing prospective angle in a case where a light source is mirrored. It is necessary to show good mirroring in both cases of a large size light source (e.g., a fluorescent lamp) and a fine light source (e.g., a linear imitational light source made by covering a fluorescent lamp with a cover). With respect to denseness of black, it is also necessary to achieve good denseness of black in both cases of viewing in perpendicular direction of a display and viewing from the angle of 45° or so in a bright environment. For achieving excellent antiglare property and denseness of black when evaluated with such indexes, it has been found to be preferable to attain a specific surface shape in the above range of the film thickness. The preferred ranges of the above particle size and refractive index of particles are suitable means for achieving a specific surface shape in the above film thickness. The preferred surface shape (surface ruggedness) of the optical film in the invention will be described below.

In the antiglare film in the invention, a surface haze value is preferably from 0.2 to 10%, and more preferably from 0.5 to 5%. When a surface haze value is too great, denseness of black deteriorates, and when it is too small, an antiglare property worsens.

A centerline average roughness Ra is preferably 0.05 μm or more and 0.25 μm or less, more preferably 0.10 μm or more and 0.20 μm or less, and most preferably 0.12 μm or more and 0.18 μm or less.

Centerline average roughness Ra can be measured according to JIS-B0601 (1982). When Ra is too large, denseness of black and bright room contrast deteriorate, and when Ra is too small, an antiglare property worsens.

For obtaining surface shape suitable for compatibility of both an antiglare property and denseness of black, average space of ruggedness Sm is also important. Sm is preferably 50

μm or more and 350 μm or less, more preferably 60 μm or more and 200 μm or less or 250 μm or more and 350 μm or less, and most preferably 60 μm or more and 150 μm or less or 300 μm or more and 350 μm or less.

Average space of ruggedness Sm can be measured according to JIS B0601 (1994). When Sm is too great, mirroring of a large size light source is liable to be seen. When Sm is too small, not only denseness of black deteriorates but also fogging at edge of a fine light source (a linear light source) is weak and not preferred. When Sm is more than 200 and less than 250 μm, surface roughness is strong and not good in appearance.

It is further preferred that both Ra and Sm are in the preferred ranges respectively.

For bettering bright room contrast, an average inclination angle θa is also necessary to be in a specific range at the same time. It is preferred that an average inclination angle θa is 0.5° or more and 3.0° or less, more preferably 0.6° or more and 2.5° or less, and most preferably 0.6° or more and 2.0° or less. When an average inclination angle is too large, not only denseness of black deteriorates but also fogging at edge of a fine light source (a linear light source) is weak and not preferred. When an average inclination angle is too small, mirroring of a large size light source is easily seen and not preferred.

The largest angle of distribution of inclination angle is preferably 0.3° or less, more preferably 0.28° or less, and most preferably 0.25° or less.

It is more preferred for both an average inclination angle θa and the largest angle of distribution of inclination angle to satisfy the preferred ranges.

The average inclination angle of the optical film in the invention is determined by the following method. That is, a vertex of a triangle having an area of from 0.5 to 2 μm$^2$ is assumed as the substrate surface of a transparent film (a support surface). The angle formed by the normal line of the face of a triangle formed by three points where three vertical lines extending vertically upward from the vertex intersecting the film surface and the vertical lines vertically extending upward from the support is taken as the inclination angle of the surface. The area of 250,000 μm$^2$ (0.25 mm$^2$) or more on the substrate is divided to the triangles and the angles of inclination are measured. The average value of all the measuring points is computed as an average inclination angle.

Figure 1A:
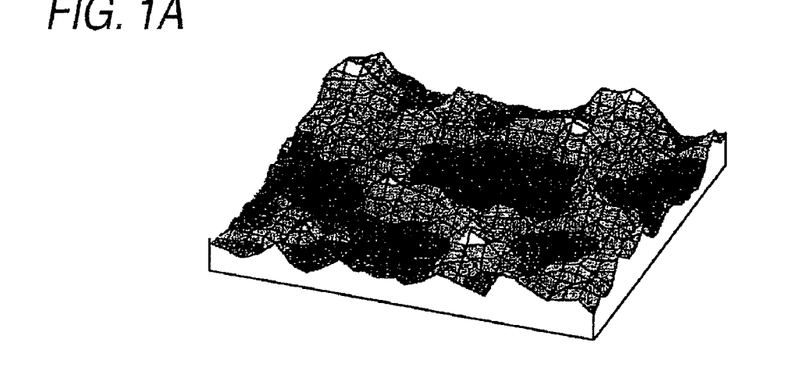
FIGS. 1A, 1B and 1C are typical drawings to explain the outline of the measuring method of an inclination angle.
Figure 1B:
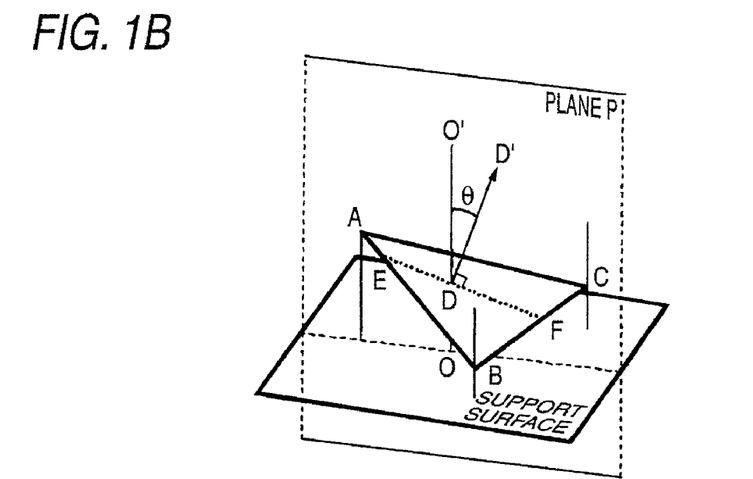
Figure 1C:
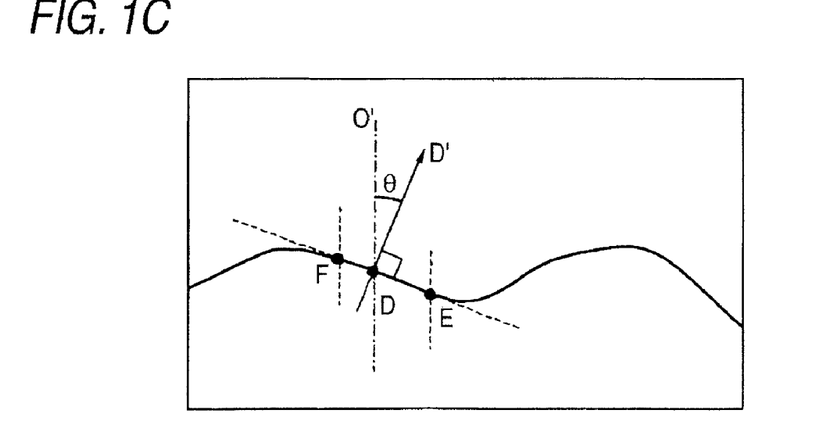

The measuring method of the inclination angle will be described in further detail. A film is divided to meshes of the area from 0.5 to 2 μm$^2$ as shown in FIG. 1A. FIG. 1B is a drawing showing extracted three points of the divided meshes. Extending three vertical lines vertically upward from three points on the support, and the points where three points intersecting the surface are taken as A, B and C. Angle θ formed by normal line DD' of triangle A, B and C face and vertical line OO' extending vertically upward from the support is taken as the inclination angle. FIG. 1C is a cross-sectional view of the film cut with plane P including points O'DD'. Line segment EF is the point of intersection of triangle A, B and C and plane P. Measuring area is preferably 250,000 μm$^2$ (0.25 mm$^2$) or more on the support. This plane is divided to triangles on the support and measured, and an inclination angle is found. There are some measuring apparatus, and the case of using Model SXM520-AS150 (manufactured by Micro Map, U.S.A.) is described. When the objective lens is 10 magnifications, the unit of measurement of the inclination angle is 0.8 μm$^2$, and the range of measurement is 500,000 μm$^2$ (0.5 mm$^2$). When the magnification of the objective lens is enlarged, the unit of measurement and the range of measurement become small therewith. The data of measurement can be analyzed with software such as MATLAB, and the distribution of inclination angle can be computed. The average inclination angle can be calculated on the basis of the data.

In the invention, an antiglare film excellent in denseness of black can be obtained by bringing surface haze and surface roughness into these ranges. The internal haze value is preferably from 10 to 35%, more preferably from 15 to 30%, and most preferably from 20 to 30%. When the internal haze is in this range, two performances of prevention of reduction of surface contrast and glaringness can be practically satisfied. These hazes can be controlled by the kind and amount of light-transmitting particles.

Surface haze and internal haze can be measured according to the following procedure.

(1) The whole haze value (H) of a film is measured according to JIS K7136.

(2) Several silicone oil droplets are dropped on the obverse and reverse of the film. The film is sandwiched between two sheets of glass plates (micro-slide glass, product No. 9111, manufactured by MATSUNAMI) having a thickness of 1 mm, and two glass plates and the film are completely optically adhered, and haze is measured in a state of free of surface haze. The haze separately measured by sandwiching silicone oil alone between two sheets of glass plates is subtracted from the above haze, and the obtained value is taken as internal haze (Hi) of the film.

(3) The value obtained by subtracting the internal haze (Hi) computed in (2) from the whole haze (H) measured in (1) is calculated as surface haze (Hs).

Light-Transmitting Resin of Antiglare Layer (a Binder for Forming a Matrix):

Binders for forming a matrix for forming the antiglare layer (hereinafter referred to as "binder") are not especially restricted, but they are preferably light-transmitting resins having a saturated hydrocarbon chain or a polyether chain as the main chain after curing by irradiation with ionizing radiation. Further, it is preferred that the main binder polymers after curing the later-described monomers have a crosslinking structure.

As the binder polymers having a saturated hydrocarbon chain as the main chain after curing, polymers of ethylenically unsaturated monomers selected from the compounds of the first group described below are preferred. As the polymers having a polyether chain as the main chain, cyclic ether-based monomers selected from the compounds of the second group shown below, e.g., polymers obtained by ring opening of epoxy-based monomers and oxetane-based monomers are preferred. Further, polymers of mixtures of these monomers are also preferred.

In the invention, as the compounds of the first group, as binder polymers having a saturated hydrocarbon chain as the main chain and having a crosslinking structure, (co)polymers of monomers having two or more ethylenically unsaturated groups are preferred. For achieving a high refractive index, it is preferred for these monomers to contain in the structures thereof an aromatic ring and at least one selected from a halogen atom exclusive of fluorine, a sulfur atom, a phosphorus atom and a nitrogen atom.

As the monomers having two or more ethylenically unsaturated groups for use in the binder polymers forming the antiglare layer, esters of polyhydric alcohols and (meth)acrylic acids [e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate], vinylbenzene and derivatives thereof (e.g., 1,4-divinylbenzene, 4-vinylbenzoic acid-2-acryloyl ethyl ester, and 1,4-divinylcyclohexanone), vinylsulfone (e.g., divinylsulfone), and (meth)acrylamide (e.g., methylene-bisacrylamide), etc., are exemplified.

Further, oligomers or prepolymers of polyfunctional compounds such as resins having two or more ethylenically unsaturated groups, e.g., low molecular weight polyester resins, polyether resins, acrylic resins, epoxy resins, urethane resins, alkyd resins, spiroacetal resins, polybutadiene resins, polythiolpolyene resins, and polyhydric alcohols are also exemplified. These monomers may be used in combination of two or more, and it is preferred that resins having two or more ethylenically unsaturated groups are used in an amount of from 10 to 100 mass % based on all the amount of binder matrix.

Polymerization of these monomers having ethylenically unsaturated groups can be performed by irradiation with ionizing radiation or heating in the presence of a photo-radical polymerization initiator or a thermal radical polymerization initiator. Accordingly, an antiglare layer is formed by preparing a coating solution containing a monomer having ethylenically unsaturated groups, a photo-radical polymerization initiator or a thermal radical polymerization initiator, and particles and, if necessary, an inorganic filler, a coating aid, other additives, and an organic solvent, coating the coating solution on a transparent support, and then performing polymerization reaction by irradiation with ionizing radiation or heating to thereby cure the coated layer. It is also preferred to perform ionizing radiation curing and thermal curing in combination. Commercially available products can be used as the photo- and thermal polymerization initiator, and these products are described in *Saishin UV Koka Gijutsu (The Latest Techniques of UV Curing)*, p. 159, publisher: Kazuhiro Takasusuki, published by Gijutsu Joho Kyokai (1991), and catalog of "Photopolymerization Initiator" of Ciba Specialty Chemicals Inc. (e.g., Irgacure series, Darocur series).

In the invention, as the compounds of the second group, it is preferred to use epoxy compounds described below for the purpose of reduction of curing shrinkage of cured films. As monomers having an epoxy group, monomers having two or more epoxy groups in the molecule are preferred, and as the examples of such monomers, epoxy monomers disclosed in JP-A-2004-264563, JP-A-2004-264564, JP-A-2005-37737, JP-A-2005-37738, JP-A-2005-140862, JP-A-2005-140863, and JP-A-2002-322430 are exemplified.

In view of the reduction of curing shrinkage, monomers having an epoxy group is preferably contained in an amount of from 20 to 100 mass % based on all the amount of the binder constituting the layer, more preferably from 35 to 100 mass %, and still more preferably from 50 to 100 mass %.

As the photo-acid generators capable of generating a cation by the action of light for the polymerization of epoxy monomers and compounds, ionic compounds, e.g., a triarylsulfonium salt and diaryliodonium salt, and nonionic compounds, e.g., nitrobenzyl ester of sulfonic acid are exemplified, and various known photo-acid generators, such as the compounds described in compiled by Organic Electronics Material Society, *Imaging-yo Yuki Zairyou (Organic materials for Imaging)*, (1997), Bunshin Design Printing Publishing And Digital Communications can be used. Especially preferred of these compounds are a sulfonium salt and an iodonium salt. As the counter ions, $PF_6^-$, $SbF_6^-$, $AsF_6^-$, and $B(C_6F_5)_4^-$ are preferred.

It is preferred to use polymerization initiators in an amount of from 0.1 to 15 mass parts as the total amount of polymerization initiators per 100 mass parts of the compounds in the first group, and more preferably from 1 to 10 mass parts.

It is preferred to use photo-acid generators in an amount of from 0.1 to 15 mass parts as the total amount of photo-acid generators per 100 mass parts of the compounds in the second group, and more preferably from 1 to 10 mass parts.

Polymer Compound of Antiglare Layer:

In the invention, the composition for forming an antiglare layer may contain a polymer compound different from the binders. By the addition of the polymer compound, curing shrinkage can be lessened and the viscosity of a coating solution can be regulated.

The polymer compound is already formed as a polymer at the time of being added to a coating solution. As the polymer compounds, e.g., cellulose esters (e.g., cellulose triacetate, cellulose diacetate, cellulose propionate, cellulose acetate propionate, cellulose acetate butyrate, cellulose nitrate, etc.), urethane acrylates, polyester acrylates, (meth)acrylic esters (e.g., a methyl methacrylate/methyl (meth)acrylate copolymer, a methyl methacrylate/ethyl(meth)acrylate copolymer, a methyl methacrylate/butyl(meth)acrylate copolymer, a methyl methacrylate/styrene copolymer, a methyl methacrylate/(meth)acrylic acid copolymer, and methyl polymethacrylate), and polystyrene are preferably used.

In view of the effects of reducing curing shrinkage and increasing the viscosity of a coating solution, the polymer compounds are preferably added from 1 to 50 mass % based on all the binder matrixes contained in the layer to contain the polymer compound, and more preferably in the range of from 5 to 40 mass %. The mass average molecular weight of the polymer compound is preferably from 3,000 to 400,000, more preferably from 5,000 to 300,000, and still more preferably from 5,000 to 200,000.

Inorganic Filler of Antiglare Layer:

The antiglare layer of the invention can also use an inorganic filler, in addition to the light-transmitting particles, for the purpose of adjustment of a refractive index, regulation of film strength, reduction of curing shrinkage, and reduction of reflectance in a case of providing a low refractive index layer. For example, it is also preferred to contain a high refractive index fine inorganic filler comprising an oxide containing at least one metallic element selected from titanium, zirconium, aluminum, indium, zinc, tin, and antimony, and having an average particle size of primary particles of generally 0.2 μm or less, preferably 0.1 μm or less, and more preferably 0.06 μm or less and 1 μm or more.

When it becomes necessary to lower the refractive index of a matrix for the adjustment of the difference in refractive index between the light-transmitting particles, as the inorganic filler, a low refractive index fine inorganic filler such as silica fine particles or hollow silica fine particles can be used. The preferred particle size is the same as that of the high refractive index fine inorganic filler.

It is also preferred for the inorganic fillers to be subjected to silane coupling surface treatment or titanium coupling treatment, and surface treating agents having a functional group capable of reacting with the binder are preferably used on the surface of the fillers.

The addition amount of the inorganic filler is preferably from 10 to 90 mass % of all the mass of the antiglare layer, more preferably from 20 to 80 mass %, and especially preferably from 30 to 75 mass %.

Since the particle size of the inorganic fillers is sufficiently shorter than the wavelengths of light, scattering is not caused, and dispersion comprising a binder polymer and the filler having dispersed therein has the nature of optically uniform material.

The refractive index of the antiglare layer is preferably from 1.46 to 1.65, more preferably from 1.49 to 1.60, and especially preferably from 1.49 to 1.53. By bringing the refractive index into this range, coating unevenness and interference irregularity can be made inconspicuous and an antiglare layer having high hardness can be obtained.

The refractive index of the film of a light-diffusing layer exclusive of the light-transmitting particles can be directly measured with an Abbe's refractiometer, or can be known by quantitative evaluation by measuring spectral reflection spectrum or by spectral ellipsometry.

Surfactant of Antiglare Layer:

In the antiglare layer in the invention, for securing surface uniformity such as resistance to coating unevenness, drying unevenness, and point defect, it is preferred to contain either a fluorine or silicone surfactant, or both of them, in a coating composition for the antiglare layer. In particular, a fluorine surfactant has the effect of improving surface failures such as coating unevenness, drying unevenness, and spot defect of the optical film of the invention with a smaller addition amount, so that a fluorine surfactant is preferably used. By the use of a fluorine surfactant, the film is provided with high-speed coating aptitude while heightening surface uniformity, so that productivity can be enhanced. As the preferred examples of fluorine surfactants, for example, the compounds disclosed in JP-A-2007-188070, paragraphs from 0049 to 0074 are exemplified.

A preferred addition amount of the surfactants (in particular, a fluorine polymer) for use in the antiglare layer in the invention is the range of from 0.001 to 5 mass % based on the coating solution, preferably from 0.005 to 3 mass %, and more preferably from 0.01 to 1 mass %. When the addition amount is 0.001 mass % or more, sufficient effect can be obtained, and when 5 mass % or less, drying of a film is sufficiently performed and good performances as a film (for example, reflectance and scratch resistance) are obtained.

Organic Solvent of Coating Solution for Antiglare Layer:

A coating composition for the antiglare layer can contain an organic solvent.

As the examples of organic solvents, alcohol-based solvents, such as methanol, ethanol, n-propanol, isopropanol, n-butanol, isobutanol, secondary butanol, tertiary butanol, isoamyl alcohol, 1-pentanol, n-hexanol, methylamyl alcohol, etc., ketone-series solvents, such as methyl isobutyl ketone (MIBK), methyl ethyl ketone (MEK), diethyl ketone, acetone, cyclohexanone, diacetone alcohol, etc., ester-based solvents, such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl lactate, ethyl lactate, etc., ether, acetal-based solvents, such as 1,4-dioxane, tetrahydrofuran, 2-methylfuran, tetrahydropyran, diethyl acetal, etc., hydrocarbon-based solvents, such as hexane, heptane, octane, isooctane, ligroin, cyclohexane, methyl cyclohexane, toluene, xylene, ethylbenzene, styrene, divinylbenzene, etc., halogenohydrocarbon-based solvents, such as carbon tetrachloride, chloroform, methylene chloride, ethylene chloride, 1,1,1-trichloroethane, 1,1,2-trichloroethane, trichloroethylene, tetrachloroethylene, 1,1,1,2-tetrachloroethane, etc., polyhydric alcohol-based solvents and derivatives thereof, such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerol monoacetate, glycerol ethers, 1,2,6-hexanetriol, etc., fatty acid-based solvents, such as formic acid, acetic acid, propionic acid, butyric acid, isobutyric acid, isovaleric acid, lactic acid, etc., nitrogen compound-based solvents, such as formamide, N,N-dimethylformamide, acetamide, acetonitrile, etc., and sulfur compound-based solvents, such as dimethyl sulfoxide, etc., are exemplified.

Of organic solvents, methyl isobutyl ketone, methyl ethyl ketone, cyclohexanone, acetone, toluene, xylene, ethyl acetate, and 1-pentanol are especially preferred. For the purpose of flocculation control, organic solvents may be optionally mixed with alcohol- and polyhydric alcohol-based solvents. These organic solvents may be used alone or as mixture. The total content of organic solvents in a coating composition is preferably from 20 to 90 mass %, more preferably from 30 to 80 mass %, and most preferably from 40 to 70 mass %. For stabilization of the surface shape of the antiglare layer, it is preferred to use a solvent having a boiling point of less than 100° C. and a solvent having a boiling point of 100° C. or higher in combination.

Curing of Antiglare Layer:

An antiglare layer can be formed, after coating a coating solution on a transparent support, through irradiation with light or electron beam, and heat treatment for crosslinking or polymerization reaction. In the case of irradiation with UV-rays, UV-rays emitted from the beam of light of an extra-high pressure mercury lamp, a high pressure mercury lamp, a low pressure mercury lamp, a carbon arc lamp, a xenon arc lamp, a metal halide lamp can be used. Curing by UV-rays is preferably carried out in the atmosphere of oxygen concentration of 4 vol % or less, more preferably 2 vol % or less, and most preferably 0.5 vol % or less, by nitrogen purge and the like.

Layers other than the antiglare layer are described below.

Low Refractive Index Layer:

The optical film in the invention preferably has a layer having a refractive index lower than that of the antiglare layer (hereinafter referred to as "a low refractive index layer") for reducing reflectance. The refractive index of the low refractive index layer is preferably from 1.20 to 1.46, more preferably from 1.25 to 1.46, and especially preferably from 1.30 to 1.40. The thickness of the low refractive index layer is preferably from 50 to 200 nm, and more preferably from 70 to 100 nm. The haze of the low refractive index layer is preferably 3% or less, more preferably 2% or less, and most preferably 1% or less.

As preferred embodiments of the curable compositions of the low refractive index layer, the following are exemplified:

(1) A composition containing a fluorine-containing compound having a crosslinkable or polymerizable functional group;

(2) A composition containing a hydrolyzed condensed product of a fluorine-containing organosilane material as the main component; and (3) A composition containing a monomer having two or more ethylenically unsaturated groups and inorganic fine particles (inorganic fine particles having a hollow structure are particularly preferred).

With respect to (1) and (2), it is also preferred to contain inorganic fine particles, and it is particularly preferred to use inorganic fine particles having a low refractive index and a hollow structure in the point of lowering of refractive index and the adjustment of the addition amount of inorganic fine particles and refractive index.

(1) A fluorine-containing compound having a crosslinkable or polymerizable functional group:

As the fluorine-containing compound having a crosslinkable or polymerizable functional group, a copolymer of a fluorine-containing monomer and a monomer having a crosslinkable or polymerizable functional group can be exemplified. The specific examples of such fluorine-containing polymers are disclosed in JP-A-2003-222702 and JP-A-2003-183322.

As disclosed in JP-A-2000-17028, a curing agent having a polymerizable unsaturated group may be used in combination in these polymers. It is also preferred, as described in JP-A-2002-145952, to use a compound having a fluorine-containing polyfunctional polymerizable unsaturated group in combination. As the examples of the compounds having a polyfunctional polymerizable unsaturated group, monomers having two or more ethylenically unsaturated groups can be exemplified. The hydrolyzed condensed products of organosilane as disclosed in JP-A-2004-170901 are also preferred, and hydrolyzed condensed products of organosilane having a (meth)acryloyl group are especially preferred. These compounds are great in the effect of combined use to the improvement of scratch resistance especially when a compound having a polymerizable unsaturated group is used in the body polymer.

When a polymer does not have a sufficient curing property by itself, a necessary curing property can be given by blending a crosslinkable compound. For example, when a body polymer contains a hydroxyl group, it is preferred to use various kinds of amino compounds as curing agents. Amino compounds used as crosslinkable compounds are compounds containing either one or both of a hydroxyalkylamino group and an alkoxyalkylamino group in total of two or more. As the specific examples of such compounds, melamine compounds, urea compounds, benzoguanamine compounds, and glycoluril compounds can be exemplified. For curing these compounds, it is preferred to use organic acids or salts thereof.

(2) A composition containing a hydrolyzed condensed product of a fluorine-containing organosilane material as the main component:

A composition containing a hydrolyzed condensed product of a fluorine-containing organosilane compound as the main component is also low in refractive index and high in hardness of the film surface and preferred. Condensed products of compounds having hydrolyzable silanol on one side terminal or both terminals to a fluorinated alkyl group and tetraalkoxysilane are preferred. Specific compositions are disclosed in JP-A-2002-265866 and Japanese Patent 317152.

(3) A composition containing a monomer having two or more ethylenically unsaturated groups and inorganic fine particles having a hollow structure:

As further preferred another embodiment, a low refractive index layer comprising low refractive index particles and a binder is exemplified. The low refractive index particles may be organic or inorganic, but particles having vacancies inside are preferred. The specific examples of the hollow particles are disclosed in the silica particles in JP-A-2002-79616. The refractive index of the particles is preferably from 1.15 to 1.40, and more preferably from 1.20 to 1.30. As the binders, the monomers having two or more ethylenically unsaturated groups described above in the item of the antiglare layer can be exemplified.

It is preferred to add the above-described photo-radical polymerization initiators or thermal radical polymerization initiators to the composition of the low refractive index layer for use in the invention. When the composition contains a radical polymerizable compound, the polymerization initiators can be used in an amount of from 1 to 10 mass parts based on the compound, and preferably from 1 to 5 mass parts.

Inorganic particles can be used in combination in the low refractive index layer for use in the invention. To give scratch resistance, fine particles having a particle size of from 15 to 150% of the thickness of the low refractive index layer can be used, preferably from 30 to 100%, and more preferably from 45 to 60%.

For the purpose of giving characteristics such as an antifouling property, water resistance, chemical resistance, and a sliding property, known polysiloxane-based or fluorine-based antifouling agents and sliding agents can be optionally added to the low refractive index layer of the invention.

As additives having a polysiloxane structure, it is also preferred to use reactive group-containing polysiloxane [e.g., "KF-100T", "X-22-169AS", "KF-102", "X-22-37011E", "X-22-164B", "X-22-5002", "X-22-173B", "X-22-174D", "X-22-167B", "X-22-161AS" (trade names, manufactured by Shin-Etsu Chemical Co., Ltd.); "AK-5", "AK-30", "AK-32" (trade names, manufactured by Toagosei Co., Ltd.); "Silaplane FM0725", "Silaplane FM0721" (trade names, manufactured by Chisso Corporation)]. The silicone compounds described in Tables 2 and 3 in JP-A-2003-112383 can also be preferably used.

As the fluorine-based compounds, compounds having a fluoroalkyl group are preferably used. The fluoroalkyl group preferably has from 1 to 20 carbon atoms, more preferably from 1 to 10 carbon atoms, which may be straight chain (e.g., $-CF_2CF_3$, $-CH_2(CF_2)_4H$, $-CH_2(CF_2)_8CF_3$, $-CH_2CH_2(CF_2)_4H$, etc.), or may have a branched structure (e.g., $CH(CF_3)_2$, $CH_2CF(CF_3)_2$, $CH(CH_3)CF_2CF_3$, $CH(CH_3)(CF_2)_5CF_2H$, etc.), or may have an alicyclic structure (preferably a 5-membered ring or a 6-membered ring, e.g., a perfluorocyclohexyl group, a perfluorocyclopentyl group, or an alkyl group substituted with these groups), or may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$, etc.). A plurality of the fluoroalkyl groups may be contained in the same molecule.

It is preferred for the fluorine-based compounds to further have substituents contributing to the formation of bonding to the film of the low refractive index layer film or compatibility with the low refractive index layer. The substituents may be the same with or different from each other, and it is preferred to have a plurality of substituents. As the examples of preferred substituents, an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group are exemplified. The fluorine-based compounds may be polymers or oligomers with compounds not containing a fluorine atom, and the molecular weight is not especially restricted. The fluorine atom content of the fluorine-based compounds is not especially restricted, but is preferably 20 mass % or more, especially preferably from 30 to 70 mass %, and most preferably from 40 to 70 mass %. The examples of the preferred fluorine-based compounds include R-2020, M-2020, R-3833, M-3833, Optool DAC (trade names, manufactured by Daikin Industries Ltd.), and Megafac F-171, F-172, F-179A, Defensa MCF-300, MCF-323 (trade names, manufactured by Dainippon Ink and Chemicals Inc.), but the fluorine-based compounds are not restricted thereto.

These polysiloxane-based fluorine compounds and compounds having a polysiloxane structure are preferably added in the range of from 0.1 to 10 mass % based on all the solids content of the low refractive index layer, and especially preferably from 1 to 5 mass %.

High Refractive Index Layer and Medium Refractive Index Layer:

In the optical film in the invention, by providing a high refractive index layer between the antiglare layer and the low refractive index layer on the opposite side to the transparent support from the antiglare layer, an antireflection property can be heightened by making use of optical interference together with the low refractive index layer. Further, it is preferred to provide, between the antiglare layer and the high refractive index layer, a medium refractive index layer having a medium refractive index between the indexes of the antiglare layer and the high refractive index layer.

In the following of the specification, the high refractive index layer and the medium refractive index layer are sometimes called high refractive index layer as a general term. Incidentally, in the invention, "high", "medium" and "low" in the high refractive index layer, medium refractive index layer and low refractive index layer indicate the relative relationship of high and low of refractive indexes among the layers. Further, describing in the relationship with the antiglare layer, it is preferred for refractive indexes to satisfy the relationship of the antiglare layer>the low refractive index layer, the high refractive index layer>the antiglare layer.

Further, in the specification of the invention, the high refractive index layer, medium refractive index layer and low refractive index layer are sometimes called an antireflection layer as a general term.

For manufacturing an antireflection film by forming a low refractive index layer on a high refractive index layer, the refractive index of the high refractive index layer is preferably from 1.55 to 2.40, more preferably from 1.60 to 2.20, and still more preferably from 1.60 to 2.00.

When an antireflection film is manufactured by coating a medium refractive index layer, a high refractive index layer and a high refractive index layer in order from the nearer side to the transparent support, the refractive index of the high refractive index layer is preferably from 1.65 to 2.40, and more preferably from 1.70 to 2.20. The refractive index of the medium refractive index layer is adjusted so as to be the value between the refractive index of the low refractive index layer and the refractive index of the high refractive index layer. The refractive index of the medium refractive index layer is preferably from 1.55 to 1.80, and more preferably from 1.55 to 1.70.

As the specific examples of the inorganic particles for use in the high refractive index layer and the medium refractive index layer, inorganic particles mainly comprising inorganic oxides such as $TiO_2$, $ZrO_2$, $Al_2O_3$, $In_2O_3$, $ZnO$, $SnO_2$, $Sb_2O_3$, and ITO are preferably used, and inorganic particles mainly comprising $SiO_2$ can be added for the adjustment of refractive index. For use in the high refractive index layer, $TiO_2$ and $ZrO_2$ are especially preferred in the aspect of increase in the refractive index. It is also preferred for the inorganic fillers to be subjected to silane coupling surface treatment or titanium coupling treatment, and surface treating agents having a functional group capable of reacting with the binder are preferably used on the surface of the fillers.

The content of the inorganic particles in the high refractive index layer is preferably from 10 to 90 mass % based on the mass of the high refractive index layer, more preferably from 15 to 80 mass %, and especially preferably from 15 to 75 mass %. Two or more kinds of inorganic particles may be used in combination in the high refractive index layer.

When a low refractive index layer is formed on a high refractive index layer, the refractive index of the high refractive index layer is preferably higher than the refractive index of the transparent support.

Antistatic Layer:

In the invention, at least one layer of the thin layers of the antireflection film may be an antistatic layer. When a curable composition containing fluorine, in particular a fluorine-containing antifouling agent, is used in the invention, low in refractive index and an excellent antifouling property can be revealed. However, since fluorine is oriented on the surface layer of the film, an antistatic property is not good and there is a possibility that a dustproof property might be aggravated. Accordingly, it is preferred in the invention to have an antistatic layer in the light of static prevention on the surface of the film.

The materials for use in an antistatic layer and performances of an antistatic layer are described in detail below.

As a method for forming an antistatic layer, conventionally known methods can be exemplified, for example, a method coating an electrically conductive coating solution containing conductive fine particles and a reactive curable resin, a method of coating a transparent and conductive material comprising a transparent and conductive polymer, and a method of forming a conductive thin film by vacuum evaporation or sputtering of metal or metallic oxide for forming a transparent film. An antistatic layer can be formed directly on a transparent support or via a primer layer for strengthening the adhesion to a transparent support. When an antistatic layer is provided as a layer near to the outermost layer of an antireflection film, an antistatic property can be sufficiently obtained even when the thickness of the layer is thin and preferred. In the invention, it is preferred that at least one layer of thin layers, or a layer positioned between the transparent support and a thin layer of the thin layers positioned nearest to the transparent support is an antistatic layer. The coating method of an antistatic layer is not especially restricted, and an appropriate method may be selected and used from known methods such as roll coating, gravure coating, bar coating and extrusion coating according to the characteristics and the coating amount of the coating solution.

It is preferred that the surface resistance of the antistatic layer has a value of resistance (SR) satisfying the following expression (4).

$$\text{Log SR} \leq 12 \tag{4}$$

In expression (4), Log SR is more preferably from 5 to 12, still more preferably from 5 to 9, and most preferably from 5 to 8. The surface resistance (SR) of the antistatic layer can be measured according to a four probe method or a circular electrode method.

Electrically Conductive Inorganic Fine Particles of Antistatic Layer:

An antistatic layer can be formed with a coating composition obtained by dissolving conductive inorganic fine particles and a reactive curable resin in a solvent. In this case, it is preferred that the conductive inorganic fine particles are formed of a metallic oxide or nitride. The examples of the metallic oxides or nitrides include a tin oxide, an indium oxide, a zinc oxide and a titanium nitride. A tin oxide and an indium oxide are especially preferred. The conductive inorganic fine particles contain these metallic oxides or nitrides as the main components, and they can further contain other elements. The main component means the component having the largest content (mass %) of the components constituting the particles. The examples of other elements include Ti, Zr, Sn, Sb, Cu, Fe, Mn, Pb, Cd, As, Cr, Hg, Zn, Al, Mg, Si, P, S, B, Nb, In, V and a halogen atom. For increasing the electrical conductivity of tin oxide and indium oxide, it is preferred to contain at least any one selected from Sb, P, B, Nb, In, V and a halogen atom. More specifically, one or two or more combinations of metallic oxides selected from tin doped indium oxide (ITO), antimony doped tin oxide (ATO), fluorine doped tin oxide (FTO), phosphorus doped tin oxide (PTO), zinc antimonate (AZO), indium doped zinc oxide (IZO), zinc oxide, ruthenium oxide, rhenium oxide, silver oxide, nickel oxide and copper oxide are exemplified. Tin doped indium oxide (ITO), antimony doped tin oxide (ATO) and phosphorus doped tin oxide (PTO) are especially preferred. The proportion of Sb in ATO is preferably from 3 to 20 mass %. The proportion of In in ITO is preferably from 5 to 20 mass %.

The average particle size of primary particles of conductive inorganic fine particles used in the antistatic layer is preferably from 1 to 150 nm, more preferably from 5 to 100 nm, and most preferably from 5 to 70 nm. The average particle size of conductive inorganic fine particles in the antistatic layer to be formed is from 1 to 200 nm, preferably from 5 to 150 nm, more preferably from 10 to 100 nm, and most preferably from 10 to 80 nm. The average particle size of conductive inorganic fine particles is an average size with the mass of the particles as weight, and it can be measured by a light scattering method or with electron microphotographs.

Conductive inorganic fine particles may be surface-treated. Surface treatment is performed with an inorganic compound or an organic compound. Alumina and silica are included in the examples of the inorganic compounds used in surface treatment. Silica treatment is especially preferred. The examples of the organic compounds for use in surface treatment include polyol, alkanolamine, stearic acid, a silane coupling agent, and a titanate coupling agent. A silane coupling agent is most preferred. Specifically, the methods described above in Surface Treatment Method of Inorganic Fine Particles in The Constituting Components (C) of the Invention, Inorganic Fine Particles can be preferably used. The method described in JP-A-2008-31327, paragraphs [0101] to [0122] can also be preferably used. Two or more surface treatments may be combined.

The shapes of conductive inorganic fine particles are preferably ellipsoidal, spherical, cubic, spindle-like, or amorphous.

Two or more conductive inorganic fine particles may be used in combination in the antistatic layer.

The proportion of conductive inorganic fine particles in the antistatic layer is preferably from 20 to 90 mass % in all the solids content, more preferably from 25 to 85 mass %, and most preferably from 30 to 80 mass %.

Conductive inorganic fine particles are used as a state of dispersion in formation of the antistatic layer. The dispersion medium of conductive inorganic fine particles is preferably a liquid having a boiling point of from 60 to 170° C. The examples of the dispersion media include water, alcohol (e.g., methanol, ethanol, isopropanol, butanol, and benzyl alcohol), ketone (e.g., acetone, methyl ethyl ketone, methyl isobutyl ketone, and cyclohexanone), ester (e.g., methyl acetate, ethyl acetate, propyl acetate, butyl acetate, methyl formate, ethyl formate, propyl formate, and butyl formate), aliphatic hydrocarbon (e.g., hexane and cyclohexane), halogenohydrocarbon (e.g., methylene chloride, chloroform, and carbon tetrachloride), aromatic hydrocarbon (e.g., benzene, toluene, and xylene), amide (e.g., dimethylformamide, dimethylacetamide, and n-methylpyrrolidone), ether (e.g., diethyl ether, dioxane, and tetrahydrofuran), and ether alcohol (e.g., 1-methoxy-2-propanol). Toluene, xylene, methyl ethyl ketone, methyl isobutyl ketone, cyclohexanone, and butanol are especially preferred. Conductive inorganic fine particles can be dispersed in a medium with a disperser. The examples of dispersers include a sand grinder mill (e.g., beads mill having pins), a high speed impeller mill, a pebble mill, a roller mill, an attritor and a colloid mill. A sand grinder mill and a high speed impeller mill are especially preferably used. Preliminary dispersing treatment may be carried out. The examples of dispersers for use in the preliminary dispersing treatment include a ball mill, a triple roll mill, a kneader and an extruder.

It is preferred that conductive inorganic fine particles are reacted with an alkoxysilane compound in an organic solvent. By the use of a reaction solution obtained by reaction of conductive inorganic fine particles and an alkoxysilane compound in advance, excellent preservation stability and a curing property can be obtained.

As the commercially available products of conductive inorganic fine particles as powders, for example, T-1 (ITO) (a trade name, manufactured by Mitsubishi Materials Corporation), Pastlan (ITO and ATO) (a trade name, manufactured by Mitsui Mining & Smelting Co., Ltd.), SN-100P (ATO) (a trade name, manufactured by Ishihara Sangyo Kaisha Ltd.), Nano Tek ITO (a trade name, manufactured by C.I. Kasei Co., Ltd.), and ATO, FTO (trade names, manufactured by Nissan Chemical Industries, Ltd.) can be exemplified.

Conductive inorganic oxide particles carrying a silicon oxide on the surfaces especially effectively react with an alkoxysilane compound, so that they are preferably used. The method of carrying a silicon oxide is disclosed in Japanese Patent 2858271, and these particles can be manufactured through processes of forming a coprecipitated product of the hydrate of tin oxide and antimony oxide, precipitating a silicon compound, classifying, and baking.

As the commercially available products of conductive inorganic oxide particles carrying a silicon oxide on the surfaces, for example, SN-100P (ATO), SNS-10M and FSS-10M (trade names, manufactured by Ishihara Sangyo Kaisha Ltd.) can be exemplified.

As the commercially available products of conductive inorganic oxide particles dispersed in an organic solvent, for example, SNS-10M (antimony doped tin oxide of MEK dispersion), FSS-10M (antimony doped tin oxide of isopropyl alcohol dispersion, trade names, manufactured by Ishihara Sangyo Kaisha Ltd.), Celnax CX-Z401M (zinc antimonate of methanol dispersion), Celnax CX-Z200IP (zinc antimonate of isopropyl alcohol dispersion, trade names, manufactured by Nissan Chemical Industries, Ltd.), and ELCOM JX-1001PTV (phosphorus-containing tin oxide of propylene glycol monomethyl ether dispersion, trade names, manufactured by Catalysts & Chemicals Ind. Co., Ltd.) can be exemplified.

Organic Solvent:

An organic solvent used in the curable composition for forming an antistatic layer is used as a dispersion medium for dispersing conductive inorganic oxide particles, as described above.

The blending amount of an organic solvent is preferably from 20 to 4,000 mass parts per 100 mass parts of the conductive inorganic oxide particles, and more preferably from 100 to 1,000 mass parts. When the amount of a solvent is less than 20 mass parts, viscosity is high and there are cases where homogeneous reaction is difficult, while when the amount exceeds 4,000 mass parts, there are cases where a coating property lowers.

As such organic solvents, for example, solvents having a boiling point of 200° C. or less at atmospheric pressure can be exemplified. Specifically, alcohols, ketones, ethers, esters, hydrocarbons and amides are used, and these solvents can be used by one kind alone, or two or more in combination. Above all, alcohols, ketones, ethers and esters are preferred.

As the alcohols, e.g., methanol, ethanol, isopropyl alcohol, isobutanol, n-butanol, tert-butanol, ethoxyethanol, butoxyethanol, diethylene glycol monoethyl ether, benzyl alcohol, and phenethyl alcohol can be exemplified. As the ketones, e.g., acetone, methyl ethyl ketone, methyl isobutyl ketone and cyclohexanone can be exemplified. As the ethers, e.g., dibutyl ether and propylene glycol monoethyl ether acetate can be exemplified. As the esters, e.g., ethyl acetate, butyl acetate and ethyl lactate can be exemplified. As the hydrocarbons, e.g., toluene and xylene can be exemplified. As the amides, e.g., formamide, dimethylacetamide and N-methylpyrrolidone can be exemplified. Of these organic solvents, isopropyl alcohol, ethoxyethanol, butoxyethanol, diethylene glycol monoethyl ether, propylene glycol monoethyl ether, methyl ethyl ketone, methyl isobutyl ketone, cyclohexanone, propylene glycol monoethyl ether acetate, butyl acetate, and ethyl lactate are preferred above all.

Binder of Antistatic Layer:

As the binders of the antistatic layer, curable resins used in the high refractive index layer, especially ionizing radiation-curable polyfunctional monomers and polyfunctional oligomers are preferably used. Crosslinked polymers formed by reaction of reactive curable resins can also be used as the binders. It is preferred for crosslinked polymers to have an anionic group.

The crosslinked polymers having an anionic group have such a structure that the main chain of the polymers having an anionic group is crosslinked. The anionic group has a function of maintaining the dispersion state of conductive inorganic fine particles. The crosslinking structure has a function of giving film-forming performance to the polymer and reinforcing the antistatic layer.

The examples of polymer main chains include polyolefin (saturated hydrocarbon), polyether, polyurea, polyurethane, polyester, polyamine, polyamide and melamine resin. Polyolefin main chain, polyether main chain, and polyurea main chain are preferred, polyolefin main chain and polyether main chain are more preferred, and polyolefin main chain is most preferred.

Polyolefin main chain consists of saturated hydrocarbon. Polyolefin main chain is obtained, e.g., by addition polymerization reaction of an unsaturated polymerizable group. Polyether main chain has repeating units bonding by an ether bond (—O—). Polyether main chain is obtained, e.g., by ring opening polymerization reaction of an epoxy group. Polyurea main chain has repeating units bonding by a urea bond (—NH—CO—NH—). Polyurea main chain is obtained, e.g., by condensation polymerization reaction of an isocyanate group and an amino group. Polyurethane main chain has repeating units bonding by a urethane bond (—NH—CO—O—). Polyurethane main chain is obtained, e.g., by condensation polymerization reaction of an isocyanate group and a hydroxyl group (including an N-methylol group). Polyester main chain has repeating units bonding by an ester bond (—CO—O—). Polyester main chain is obtained, e.g., by condensation polymerization reaction of a carboxyl group (including an acid halide group) and a hydroxyl group (including an N-methylol group). Polyamine main chain has repeating units bonding by an imino bond. Polyamine main chain is obtained, e.g., by ring opening polymerization reaction of an ethyleneimine group. Polyamide main chain has repeating units bonding by an amide bond (—NH—CO—). Polyamide main chain is obtained, e.g., by the reaction of an isocyanate group and a carboxyl group (including an acid halide group). Melamine resin main chain is obtained, e.g., by condensation polymerization reaction of a triazine group (e.g., melamine) and aldehyde (e.g., formaldehyde). In melamine resin, the main chain itself has a crosslinking structure.

An anionic group is directly bonded to the main chain of a polymer or bonded to the main chain via a linking group. It is preferred that an anionic group is bonded to the main chain via a linking group as the side chain.

The examples of anionic groups include a carboxylic acid group (carboxyl), a sulfonic acid group (sulfo), and a phosphoric acid group (phosphono), and a sulfonic acid group and a phosphoric acid group are preferred.

An anionic group may be the state of a salt. As cations forming a salt with an anionic group, an alkali metal ion is preferred. Further, the proton of an anionic group may be dissociated.

Linking groups bonding an anionic group to a polymer main chain are preferably a divalent group selected from —CO—, —O—, an alkylene group, an arylene group, and combinations of these groups.

A crosslinking structure chemically bonds two or more main chains (preferably a covalent bonding). It is preferred for a crosslinking structure to bond three or more main chains by covalent bonding. Crosslinking structures preferably comprise divalent or higher groups selected from —CO—, —O—, —S—, a nitrogen atom, a phosphorus atom, an aliphatic residue, an aromatic residue and combinations of these groups.

Polymers having a crosslinked anionic group are preferably copolymers having a repeating unit having an anionic group and a repeating unit having a crosslinking structure. The proportion of the repeating unit having an anionic group in the copolymer is preferably from 2 to 96 mass %, more preferably from 4 to 94 mass %, and most preferably from 6 to 92 mass %. The repeating unit may have two or more anionic groups. The proportion of the repeating unit having a crosslinking structure in the copolymer is preferably from 4 to 98 mass %, more preferably from 6 to 96 mass %, and most preferably from 8 to 94 mass %.

The repeating unit of the polymer having a crosslinked anionic group may have both of the anionic group and the crosslinking group. Further, other repeating units (repeating units having neither an anionic group nor a repeating unit) may be contained.

As other repeating units, a repeating unit having an amino group or a quaternary ammonium group and a repeating unit having a benzene ring are preferred. An amino group or a quaternary ammonium group has a function of maintaining the dispersion state of inorganic fine particles similar to anionic groups. Even when an amino group, a quaternary ammonium group and a benzene ring are contained in a repeating unit having an anionic group or a repeating unit having a crosslinking structure, the same effects can be obtained.

In the repeating unit having an amino group or a quaternary ammonium group, the amino group or the quaternary ammonium group is directly bonded to the main chain of the polymer or bonded to the main chain via a linking group. It is preferred that the amino group or the quaternary ammonium group is bonded to the main chain via a linking group as the side chain. The amino group or the quaternary ammonium group is preferably a secondary amino group, a tertiary amino group, or a quaternary ammonium group, and more preferably a tertiary amino group or a quaternary ammonium group. A group bonding to the nitrogen atom of a secondary amino group, a tertiary amino group, or a quaternary ammonium group is preferably an alkyl group, preferably an alkyl group having from 1 to 12 carbon atoms, and more preferably an alkyl group having from 1 to 6 carbon atoms. The counter ion of the quaternary ammonium group is preferably a halide ion. Linking groups bonding the amino group or quaternary ammonium group to the polymer main chain are preferably a divalent group selected from —CO—, —NH—, —O—, an alkylene group, an arylene group, and combinations of these groups. When the polymer having a crosslinked anionic group contains a repeating unit having an amino group or a quaternary ammonium group, the proportion is preferably from 0.06 to 32 mass %, more preferably from 0.08 to 30 mass %, and most preferably from 0.1 to 28 mass %.

The above binders can also be used in combination with the following reactive organic silicon compounds as disclosed in JP-A-2003-39586. The reactive organic silicon compound is used in the range of from 10 to 70 mass % based on ionizing radiation-curable resin as the above binder. As the reactive organic silicon compounds, organosilane compounds are preferably used, and it is also possible to form an antistatic layer with an organosilane compound alone as the resin component.

Solvent:

The solvent capable of dissolving the coating compositions for forming all the layers other than the antistatic layer is not restricted, but alcohol solvents and ketone solvents are preferably used. Specifically, acetone, methyl ethyl ketone, 2-pentanone, 3-pentanone, 2-hexane, 2-heptanone, 4-heptanone, methyl isopropyl ketone, ethyl isopropyl ketone, diisopropyl ketone, methyl isobutyl ketone, methyl-t-butyl ketone, diacetyl, acetylacetone, acetonylacetone, diacetone alcohol, mesityl oxide, chloroacetone, cyclopentanone, cyclohexanone, and acetophenone can be exemplified. Of these solvents, methyl ethyl ketone and methyl isobutyl ketone are preferred. These solvents may be used alone, or may be used as a mixed solvent in an optional mixing ratio.

As auxiliary solvents, ester solvents such as propylene glycol monomethyl ether acetate and fluorine solvents (fluorine-based alcohol, etc.) can be arbitrarily used. These solvents may be used alone, or may be used as a mixed solvent in an optional mixing ratio.

In the invention, preferred average reflectance of the antireflection antiglare film provided with a low refractive index layer is preferably 3.5% or less, more preferably 3.0% or less, still more preferably 2.0% or less, and most preferably 2.0 or less and 0.3% or more. By lowering average reflectance, a sufficient antiglare property can be obtained even if light scattering on the surface of the antiglare film is made small, thus an antiglare antireflection film excellent in denseness of black can be obtained.

Average reflectance is measured as follows. The reverse of a film is roughened with sand paper and treated with black ink to get rid of reverse reflection. The spectral reflectance of the obverse of the film is measured in the wavelength region of from 380 to 780 nm by means of a spectrophotometer with an integrating sphere. Arithmetic mean value of the reflectance in 450 to 650 nm is used.

Transparent Support:

As the transparent support of the optical film in the invention, it is preferred to use a plastic film. As the polymers for forming a plastic film, cellulose acylate (e.g., triacetyl cellulose, diacetyl cellulose, representatively TAC-TD80U, TD80UF, etc., manufactured by Fuji Photo Film Co., Ltd.), polyamide, polycarbonate, polyester (e.g., polyethylene terephthalate, polyethylene naphthalate), polystyrene, polyolefin, norbornene resin (Arton, a trade name, manufactured by JSR), amorphous polyolefin (Zeonex, a trade name, manufactured by ZEON CORPORATION), and (meth)acrylic resin (Acrypet VRL20A, a trade name, manufactured by Mitsubishi Rayon Co., Ltd., the ring structure-containing acrylic resin described in JP-A-2004-70296 and JP-A-2006-171464) are exemplified. Of these polymers, triacetyl cellulose, polyethylene terephthalate and polyethylene naphthalate are preferred, and triacetyl cellulose is especially preferred.

When the optical film of the invention is used in a liquid crystal display, an adhesive layer is provided on one side and arranged on the outermost surface of the display. The optical film of the invention may be combined with a polarizing plate. When the transparent support is triacetyl cellulose, since triacetyl cellulose is used as a protective film for protecting the polarizing layer of the polarizing plate, the optical film of the invention can be used as it is as the protective film, which is economically advantageous.

When the optical film of the invention is provided with an adhesive layer and arranged on the outermost surface of the display, or used as it is as a protective film for a polarizing plate, it is preferred for sufficient adhesion to form an outermost layer on the transparent support and perform saponification treatment. The saponification treatment is carried out by known methods, e.g., the film is immersed in an alkali liquid for proper time. After immersion in an alkali liquid, it is preferred that the film is sufficiently washed with water so that alkali component does not remain in the film, or the film is immersed in a dilute acid to neutralize alkali component. By saponification treatment, the surface of the transparent support on the opposite side to the side having the outermost layer is made hydrophilic.

Coating Method:

The optical film in the invention can be formed by the following methods, but the invention is not restricted to these methods. In the first place, a coating solution containing the components for forming each layer is prepared. Subsequently, a coating solution for forming each functional layer is coated in the transparent support by any of a dip coat method, an air knife coating method, a curtain coating method, a roller coating method, a wire bar coating method, a gravure coating method and a die coating method, and then the coated solution is heated and dried. A micro gravure coating method, a wire bar coating method, and a die coating method (refer to U.S. Pat. No. 2,681,294 and JP-A-2006-122889) are more preferred, and a die coating method is especially preferred.

Subsequently, the monomer for forming a functional layer is polymerized and cured by light irradiation of UV-ray, ionizing radiation or heating, preferably irradiation with ionizing radiation with heating. Thus, a functional layer is formed. If necessary, the functional layer may comprise a plurality of layers.

In the next place, a coating solution for forming a low refractive index layer is coated on the functional layer in the same manner, and then the coated solution is irradiated with light or heated (cured by irradiation with UV-ray or ionizing radiation, preferably irradiation with ionizing radiation with heating), thus a low refractive index layer is formed, and an optical film laminated with the low refractive index layer is obtained.

Polarizing Plate:

A polarizing plate mainly comprises two protective films for protecting the obverse and the reverse of a polarizing film. The optical film of the invention is preferably used as at least one of the two protective films for sandwiching a polarizing film from both sides. Since the optical film of the invention unites a protective film, the manufacturing costs of a polarizing plate can be reduced. Further, by the use of the optical film of the invention as the outermost layer, mirroring of outer light is prevented, and a polarizing plate excellent in scratch resistance and an antifouling property can be manufactured.

The hydrophilized surface is particularly effective to improve adhesion to a polarizing film mainly comprising polyvinyl alcohol. Further, since dusts in air are difficult to be adhered to the hydrophilized surface, dusts are difficult to enter between the polarizing film and the optical film at the time of adhering the optical film to the polarizing film, which is very effective to prevent point defect by dusts.

It is preferred to perform saponification treatment so that the contact angle to water of the surface of the transparent support on the side opposite to the side having the outermost layer is 40° or less, more preferably 30° or less, and especially preferably 20° or less.

Image Display:

The optical film in the invention can be applied to image displays such as a liquid crystal display (LCD), a plasma display panel (PDP), an electroluminescence display (ELD), a cathode ray tube display (CRT) and surface electric field display (SED). The optical film is particularly preferably used in a liquid crystal display (LCD). Since the optical film in the invention has a transparent support, it is used by adhering the transparent support side to the image display surface of the image display.

When the optical film of the invention is used as one side of the surface protective films of a polarizing film, it can be preferably used in a transmission type, a reflection type and semi-transmission type of liquid crystal displays of a mode, such as twisted nematic (TN), super twisted nematic (STN), vertical alignment (VA), in-plane switching (IPS), and optically compensated bend cell (OCB).

EXAMPLE

The invention will be described in further detail with reference to examples, but the invention is by no means restricted thereto. In the examples "parts" and "%" mean by mass unless otherwise indicated.

| Composition of Coating Solution A-1 for Antiglare Layer: | |
|---|---|
| PET-30 | 65.0 g |
| Irgacure 127 | 3.0 g |
| Dispersion of 8 μm crosslinked acryl-styrene particles a (30%) | 52.6 g |
| Dispersion of 8 μm crosslinked acryl particles b (30%) | 20.0 g |
| SP-13 | 0.2 g |
| CAB-531-1 | 0.5 g |
| MIBK | 72.6 g |
| MEK | 32.5 g |
| Composition of Coating Solution A-2 for Antiglare Layer: | |
| PET-30 | 65.0 g |
| Irgacure 127 | 3.0 g |
| Dispersion of 12 μm crosslinked acryl-styrene particles c (30%) | 3.6 g |
| Dispersion of 8 μm crosslinked acryl particles b (30%) | 69.0 g |
| SP-13 | 0.2 g |
| CAB-531-1 | 0.5 g |
| MIBK | 72.6 g |
| MEK | 32.5 g |
| Composition of Coating Solution A-3 for Antiglare Layer: | |
| PET-30 | 39.1 g |
| DPHA | 26.0 g |
| Irgacure 127 | 3.0 g |
| Dispersion of 10 μm crosslinked acryl-styrene particles e (30%) | 19.9 g |
| Dispersion of 10 μm crosslinked acryl particles f (30%) | 52.5 g |
| SP-13 | 0.2 g |
| CAB-531-1 | 0.5 g |
| MIBK | 72.8 g |
| MEK | 32.5 g |
| Composition of Coating Solution A-4 for Antiglare Layer: | |
| PET-30 | 41.2 g |
| DPHA | 27.5 g |
| Irgacure 127 | 3.0 g |
| Dispersion of 10 μm crosslinked acryl-styrene particles e (30%) | 60.3 g |
| SP-13 | 0.2 g |
| CAB-531-1 | 0.5 g |
| MIBK | 81.2 g |
| MEK | 32.5 g |
| Composition of Coating Solution A-5 for Antiglare Layer: | |
| PET-30 | 35.8 g |
| DPHA | 23.8 g |
| Irgacure 127 | 3.0 g |
| Dispersion of 8 μm crosslinked acryl particles b (30%) | 90.5 g |
| SP-13 | 0.2 g |
| CAB-531-1 | 0.5 g |
| MIBK | 60.1 g |
| MEK | 32.5 g |
| Composition of Coating Solution A-6 for Antiglare Layer: | |
| PET-30 | 72.3 g |
| Irgacure 127 | 3.0 g |
| Dispersion of 6 μm crosslinked acryl-styrene particles g (30%) | 30.2 g |
| Dispersion of 6 μm crosslinked acryl particles h (30%) | 18.1 g |
| SP-13 | 0.2 g |
| CAB-531-1 | 0.5 g |
| MIBK | 89.6 g |
| MEK | 32.5 g |
| Composition of Coating Solution A-7 for Antiglare Layer: | |
| PET-30 | 72.3 g |
| Irgacure 127 | 3.0 g |
| Dispersion of 8 μm crosslinked acryl-styrene particles a (30%) | 36.2 g |
| Dispersion of 20 μm crosslinked acryl particles i (30%) | 12.1 g |
| SP-13 | 0.2 g |
| CAB-531-1 | 0.5 g |
| MIBK | 89.6 g |
| MEK | 32.5 g |
| Composition of Coating Solution A-8 for Antiglare Layer: | |
| PET-30 | 72.3 g |
| Irgacure 127 | 3.0 g |
| Dispersion of 10.5 μm melamine resin particles j (30%) | 12.1 g |
| Dispersion of 8 μm crosslinked acryl particles b (30%) | 36.2 g |
| SP-13 | 0.2 g |
| CAB-531-1 | 0.5 g |
| MIBK | 89.6 g |
| MEK | 32.5 g |
| Composition of Coating Solution A-9 for Antiglare Layer: | |
| PET-30 | 78.6 g |
| Irgacure 127 | 3.0 g |
| Dispersion of 8 μm crosslinked acryl-styrene particles k (30%) | 18.1 g |
| Dispersion of 8 μm crosslinked acryl particles b (30%) | 9.0 g |
| SP-13 | 0.2 g |
| CAB-531-1 | 0.5 g |
| MIBK | 104.4 g |
| MEK | 32.5 g |

Each of the above coating solution compositions for antiglare layers is filtered through a polypropylene filter having a pore diameter of 30 μm to prepare a coating solution.

A film is formed by each of coating solutions A-1 to A-9 from which particles are removed. The refractive index of light-transmitting resin is directly measured with an Abbe's refractometer.

The refractive index of the film of a light-diffusing layer exclusive of the light-transmitting particles is directly measured with an Abbe's refractometer. Further, the refractive index of light-transmitting particles is measured as follows. Arbitrary two kinds of solvents different in a refractive index selected from methylene iodide, 1,2-dibromopropane, and n-hexane are mixed by changing the mixing ratio to change the refractive index, and light transmitting particles are dispersed in an equivalent amount in the solvents and turbidity is measured. The refractive index at the time when the turbidity becomes minimum is measured with an Abbe's refractometer as the refractive index of the light-transmitting particles.

The refractive indexes of the particles are as shown below.

| | |
|---|---|
| 8 µm crosslinked acryl-styrene particles a | 1.555 |
| 8 µm crosslinked acryl particles b | 1.500 |
| 12 µm crosslinked acryl-styrene particles c | 1.515 |
| 10 µm crosslinked acryl-styrene particles e | 1.555 |
| 10 µm crosslinked acryl particles f | 1.500 |
| 6 µm crosslinked acryl-styrene particles g | 1.555 |
| 6 µm crosslinked acryl particles h | 1.500 |
| 20 µm crosslinked acryl particles i | 1.500 |
| 10.5 µm melamine resin particles j | 1.650 |
| 8 µm crosslinked acryl-styrene particles k | 1.575 |
| Composition of Coating Solution L-1 for Low Refractive Index Layer: | |
| Fluorine polymer (A-1) containing ethylenically unsaturated group | 3.9 g |
| Silica dispersion A (22%) | 25.0 g |
| Irgacure 127 | 0.2 g |
| DPHA | 0.4 g |
| MEK | 100.0 g |
| MIBK | 45.5 g |

The above coating solution composition for a low refractive index layer is filtered through a polypropylene filter having a pore diameter of 1 µm to prepare a coating solution. The refractive index after curing of the low refractive index layer obtained by coating the above coating solution is 1.360.

The compounds used are shown below.
PET-30: A mixture of pentaerythritol triacrylate and pentaerythritol tetraacrylate (Nippon Kayaku Co., Ltd.)
DPHA: A mixture of dipentaerythritol pentaacrylate and dipentaerythritol hexaacrylate (Nippon Kayaku Co., Ltd.)
Dispersion of 8 µm crosslinked acryl-styrene particles a (content of particles: 30%):
MIBK dispersion of 8 µm crosslinked acryl-styrene particles a (refractive index: 1.555, particle size: 8.0 µm) (manufactured by Sekisui Chemical Co., Ltd.) dispersed with POLYTRON at 10,000 rpm for 20 minutes
Dispersion of 8 µm crosslinked acryl particles b (content of particles: 30%): MIBK dispersion of 8 µm crosslinked acryl particles b (refractive index: 1.500, particle size: 8.0 µm) (manufactured by The Soken Chemical & Engineering Co., Ltd.) dispersed with POLYTRON at 10,000 rpm for 20 minutes
Dispersion of 12 µm crosslinked acryl-styrene particles c (content of particles: 30%): MIBK dispersion of 12 µm crosslinked acryl-styrene particles c (refractive index: 1.515, particle size: 12.0 µm) (manufactured by Sekisui Chemical Co., Ltd.) dispersed with POLYTRON at 10,000 rpm for 20 minutes
Dispersion of 10 µm crosslinked acryl-styrene particles e (content of particles: 30%): MIBK dispersion of 10 µm crosslinked acryl-styrene particles e (refractive index: 1.555, particle size: 10.0 µm) (manufactured by Sekisui Chemical Co., Ltd.) dispersed with POLYTRON at 10,000 rpm for 20 minutes
Dispersion of 10 µm crosslinked acryl particles f (content of particles: 30%): MIBK dispersion of 10 µm crosslinked acryl particles f (refractive index: 1.500, particle size: 10.0 µm) (manufactured by The Soken Chemical & Engineering Co., Ltd.) dispersed with POLYTRON at 10,000 rpm for 20 minutes
Dispersion of 6 µm crosslinked acryl-styrene particles g (content of particles: 30%): MIBK dispersion of 6 µm crosslinked acryl-styrene particles g (refractive index: 1.555, particle size: 6.0 µm) (manufactured by Sekisui Chemical Co., Ltd.) dispersed with POLYTRON at 10,000 rpm for 20 minutes
Dispersion of 6 µm crosslinked acryl particles h (content of particles: 30%): MIBK dispersion of 6 µm crosslinked acryl particles h (refractive index: 1.500, particle size: 6.0 µm) (manufactured by The Soken Chemical & Engineering Co., Ltd.) dispersed with POLYTRON at 10,000 rpm for 20 minutes
Dispersion of 20 µm crosslinked acryl particles i (content of particles: 30%): MIBK dispersion of 20 µm crosslinked acryl particles i (refractive index: 1.500, particle size: 20.0 µm) (manufactured by The Soken Chemical & Engineering Co., Ltd.) dispersed with POLYTRON at 10,000 rpm for 20 minutes
Dispersion of 10.5 µm melamine resin particles j (content of particles: 30%): MIBK dispersion of 10.5 µm melamine resin particles j (refractive index: 1.650, particle size: 10.5 µm) (manufactured by Nissan Chemical Industries Ltd.) dispersed with POLYTRON at 10,000 rpm for 20 minutes
Dispersion of 8 µm crosslinked acryl-styrene particles k (content of particles: 30%): MIBK dispersion of 8 µm crosslinked acryl-styrene particles k (refractive index: 1.575, particle size: 8.0 µm) (manufactured by Sekisui Chemical Co., Ltd.) dispersed with POLYTRON at 10,000 rpm for 20 minutes
Irgacure 127: a polymerization initiator (manufactured by Ciba Specialty Chemicals Inc.)
CAB-531-1: Cellulose acetate butyrate (manufactured by Eastman Chemical Company)
Fluorine-containing polymer containing ethylenically unsaturated group (A-1): Fluorine polymer (A-1) disclosed in JP-A-2005-89536, Manufacturing Example 3
SP-13: Fluorine surfactant (use after dissolving as a 10 mass % MEK solution)

SP-13

Silica Dispersion A:
To 500 g of hollow silica fine particle sol (isopropyl alcohol-silica sol, an average particle size: 60 mm, shell thickness: 10 nm, silica concentration: 20 mass %, the refractive index of the silica particles: 1.31, manufactured by changing sizes according to JP-A-2002-79616, Preparation Example 4) are added 10 g of acryloyloxypropyltrimethoxysilane (manufactured by Shin-Etsu Chemical Co., Ltd.), and 1.0 g of diisopropoxyaluminum ethyl acetate, and the system is mixed, followed by addition of 3 g of ion exchange water. The reaction mixture is subjected to reaction at 60° C. for 8 hours, and then the temperature is lowered to room temperature, and then 1.0 g of acetylacetone is added. To 500 g of the dispersion, cyclohexanone is added so that the content of the silica becomes almost constant, and the solvent is substituted by distillation under reduced pressure. The generation of foreign matters in the dispersion is not seen, and the viscosity at the time when the solid concentration regulated with cyclohexanone reaches 22 mass % is 5 mPa·s at 25° C. The residual amount of isopropyl alcohol in the obtained dispersion A analyzed by gas chromatography is 1.0%.

Example 1

Manufacture of Optical Film Samples 101 to 112

(1) Coating of Antiglare Layer

A triacetyl cellulose film having a thickness of 80 µm (TAC-TD80U, manufactured by Fuji Photo Film Co., Ltd.) is unwound from a roll. The coating solution for antiglare layer shown in Table 1 below is coated by a die coating method using a slot die as disclosed in JP-A-2006-122889, Example 1, at a carrying speed of 30 m/min, and dried at 60° C. for 150 seconds. The film is further irradiated with UV-ray under nitrogen purge at oxygen concentration of about 0.1%, with an air cooling metal halide lamp of 160 W/cm (manufactured by EYEGRAPHICS CO., LTD.), illuminance of 400 mW/cm$^2$, irradiation quantity of 100 mJ/cm$^2$, the coated layer is cured and the film is rewound. The coating amount of the solution is adjusted so that the film thickness of each antiglare layer becomes the value shown in Table 1.

(2) Coating of Low Refractive Index Layer

The triacetyl cellulose film coated with antiglare layer is unwound again. Low refractive index layer coating solution L-1 is coated on the film with the same slot die and die coating method at a carrying speed of 30 m/min, and dried at 90° C. for 75 seconds. The film is further irradiated with UV-ray under nitrogen purge at oxygen concentration of from 0.01 to 0.1%, with an air cooling metal halide lamp of 240 W/cm (manufactured by EYEGRAPHICS CO., LTD.), illuminance of 400 mW/cm$^2$, irradiation quantity of 240 mJ/cm$^2$ to form a low refractive index layer having a thickness of 100 nm, and the film is rewound. Thus an antiglare antireflection film is manufactured.

Saponification Treatment of Optical Film:

The coated sample is subjected to the following treatment. A sodium hydroxide aqueous solution (1.5 mol/liter) is prepared and maintained at 55° C. A dilute sulfuric acid aqueous solution (0.01 mol/liter) is prepared and maintained at 35° C. The optical film manufactured is immersed in the above sodium hydroxide aqueous solution for 2 minutes, and then immersed in water and the sodium hydroxide aqueous solution is thoroughly washed. Subsequently, the film is immersed in the dilute sulfuric acid aqueous solution for 1 minute, and then immersed in water and the dilute sulfuric acid aqueous solution is thoroughly washed. Lastly, the sample is sufficiently dried at 120° C.

In this manner, each of optical films (Sample Nos. 101 to 112) subjected to saponification treatment is manufactured.

Manufacture of Polarizing Plate:

A polarizing film is manufactured by the adsorption of iodide onto polyvinyl alcohol and stretching. Both surfaces of the polarizing film are adhered to a triacetyl cellulose film (TAC-TD80U, manufactured by Fuji Photo Film Co., Ltd.) having a thickness of 80 µm immersed in an NaOH aqueous solution (1.5 mol/liter) at 55° C. for 2 minutes, neutralized and washed, and to the sample subjected to saponification treatment in Example 1, and the adhered sample is protected, thus a polarizing plate is manufactured.

Evaluation of Optical Film and Polarizing Plate:

The optical film samples and polarizing plate sample are evaluated as to the following items. The results obtained are shown in Table 1.

(1) Surface Shape

Surface roughness (Ra):

Centerline average roughness (Ra) (µm) is measured according to JIS B0601 (1982) with Surfcorder model SE-3F (manufactured by Kosaka Laboratory Ltd.).

Measuring Conditions:
Length for evaluation: 2.5 mm
Cutoff: 0.25 mm
Speed: 0.5 mm/s
Diameter of probe: 2 µm
Load: 30 µN Average Space between Peak and Valley (Sm):

The average value of the space of one cycle of peak and valley Sm (µm) found from the intersection where the roughness curve intersects the centerline is measured. Surfcorder model SE-3F (manufactured by Kosaka Laboratory Ltd.) is used.

Measuring conditions:
Length for evaluation: 2.5 mm
Cutoff: 0.25 mm
Speed: 0.5 mm/s
Diameter of probe: 2 µm
Load: 30 µN Average inclination angle (θa), the largest angle of distribution of inclination angle:

In the above method, measurement is performed with Model SXM520-AS150 (manufactured by Micro Map, U.S.A.), objective lens: 10 magnifications, CCD camera: KP-MU (manufactured by Hitachi Denshi Ltd.), measuring range: 816 µm×618 µm, measuring wavelength: 560 nm, and measurement mode: WAVE. The data of measurement are analyzed by MAT-LAB, and average inclination angle (θa) and the largest angle of distribution of inclination angle are computed.

(2) Haze (1) The whole haze value (H) of a film is measured according to JIS K7136.

(2) Several silicone oil droplets are dropped on the obverse and reverse of the film. The film is sandwiched between two sheets of glass plates (micro-slide glass, product No. 9111, manufactured by MATSUNAMI) having a thickness of 1 mm, and two glass plates and the film are completely optically adhered, and haze is measured in a state of free of surface haze. The haze separately measured by sandwiching silicone oil alone between two sheets of glass plates is subtracted from the above haze, and the obtained value is taken as internal haze (Hi) of the film.

(3) The value obtained by subtracting the internal haze (Hi) computed in (2) from the whole haze (H) measured in (1) is calculated as surface haze (Hs).

(3) Average Reflectance

Average reflectance is measured as follows. The reverse of a film is roughened with sand paper and treated with black ink to get rid of reverse reflection. The spectral reflectance of the obverse of the film is measured in the wavelength region of from 380 to 780 nm by means of a spectrophotometer with an integrating sphere (manufactured by JASCO Corporation). Arithmetic mean value of the reflectance in 450 to 650 nm is used as average reflectance.

(4) Denseness of Black

Denseness of black is evaluated with a liquid crystal display stuck with a polarizing plate sample on the viewer side surface is arranged such that the low refractive index layer is on the viewer side. Evaluation is performed by a system of relative comparison at the same time using a plurality of displays arrayed. Black at the time of electric source is off and black (black image) at the time of electric source is on are compared from the front, and evaluated by the following criteria. The criteria are based on the fact that the stronger the black, the tighter is the image plane.

A: Black is strong in any of directions of 5° and 45°, and the image plane is very tight. The position of the evaluator is a position where mirroring of a fluorescent lamp is not seen from either angle.

B: Black is strong in any of directions of 5° and 45°, and the image plane is tight.

C: Image plane is grayish in either of direction of 5° or 45° or in both directions, and the image plane is not so tight.

D: Gray is strong in either of direction of 5° or 45° or in both directions, and tightness of the image plane is not seen.

(5) Antiglare Property

The reverse of the layer-coated side of the obtained optical film is entirely painted out with black ink. The degree of fogging of the reflected image is evaluated on the following criteria with respect to the case where a naked fluorescent lamp (8,000 cd/m$^2$) free of a louver is lighted from the angle of 5° and observed from the angle of −5°, and the case of lighting from the angle of 45° and observing from the angle of −45°.

A: The contour of the fluorescent lamp is slightly observed at −5° and −45°.

B: The contour of the fluorescent lamp is slightly observed at −5°, but the contour is relatively clearly seen at −45°.

C: The contour of the fluorescent lamp is relatively clearly seen at −5° and −45°.

D: The contour of the fluorescent lamp is clearly seen at −5° and −45°, or dazzling.

(6) Resistance to Brittleness (Resistance to Cracking)

The obtained optical film sample is cut to a size of 35 mm×140 mm. The cut film is allowed to stand at 25° C., RH 60% for 2 hours, and then the film is rolled. The diameter of curvature at the time when the film starts to crack due to rolling of the film is measured, and the crack on the surface is evaluated by the following criteria.

A: The film does not crack even when the diameter of curvature is 30 mm, or the length of the crack is less than 1 mm on average.

B: The film does not crack even when the diameter of curvature is 40 mm, or the length of the crack is less than 1 mm on average.

C: The film does not crack even when the diameter of curvature is 50 mm, or the length of the crack is less than 1 mm on average.

D: The diameter of curvature is 50 mm and the length of the crack is 1 mm or more on average.

The results of evaluations of each sample are shown in Table 1 below.

TABLE 1

| Sample No. | Coating Solution for Antiglare Layer | Refractive Index of Particles A | Difference in Refractive Index between Particles A and Matrix | Particle Size of Particles A (μm) | Content of Particles A (%) | Refractive Index of Particles B | Difference in Refractive Index between Particles B and Matrix | Remarks |
|---|---|---|---|---|---|---|---|---|
| 101 | A-1 | 1.555 | 0.030 | 8.0 | 17.4 | 1.500 | −0.025 | Invention |
| 102 | A-2 | 1.515 | −0.010 | 12.0 | 1.2 | 1.500 | −0.025 | Invention |
| 103 | A-1 | 1.555 | 0.030 | 8.0 | 17.4 | 1.500 | −0.025 | Comparison |
| 104 | A-2 | 1.515 | −0.010 | 12.0 | 1.2 | 1.500 | −0.025 | Comparison |
| 105 | A-1 | 1.555 | 0.030 | 8.0 | 17.4 | 1.500 | −0.025 | Invention |
| 106 | A-3 | 1.555 | 0.030 | 10.0 | 6.6 | 1.500 | −0.025 | Invention |
| 107 | A-4 | 1.555 | 0.030 | 10.0 | 20.0 | — | — | Comparison |
| 108 | A-5 | — | — | — | — | 1.500 | −0.025 | Comparison |
| 109 | A-6 | 1.555 | 0.030 | 6.0 | 10.0 | 1.500 | −0.025 | Comparison |
| 110 | A-7 | 1.555 | 0.030 | 8.0 | 12.0 | 1.500 | −0.025 | Comparison |
| 111 | A-8 | 1.650 | 0.125 | 10.5 | 4.0 | 1.500 | −0.025 | Comparison |
| 112 | A-9 | 1.575 | 0.050 | 8.0 | 6.0 | 1.500 | −0.025 | Comparison |

| Sample No. | Particle Size of Particles B (μm) | Content of Particles B (%) | Content of All Particles (%) | Thickness of Antiglare Layer | Refractive Index of Antiglare Layer Matrix | Ra (μm) | Sm (μm) | θa (°) | Remarks |
|---|---|---|---|---|---|---|---|---|---|
| 101 | 8.0 | 6.6 | 24.1 | 14.0 | 1.525 | 0.15 | 70 | 1.8 | Invention |
| 102 | 8.0 | 22.9 | 24.1 | 11.0 | 1.525 | 0.20 | 300 | 1.3 | Invention |
| 103 | 8.0 | 6.6 | 24.1 | 20.0 | 1.525 | 0.10 | 60 | 1.1 | Comparison |
| 104 | 8.0 | 22.9 | 24.1 | 6.0 | 1.525 | 0.24 | 45 | 3.0 | Comparison |
| 105 | 8.0 | 6.6 | 24.1 | 11.0 | 1.525 | 0.16 | 65 | 2.1 | Invention |
| 106 | 10.0 | 17.4 | 24.1 | 14.0 | 1.525 | 0.16 | 88 | 1.1 | Invention |
| 107 | — | — | 20.0 | 14.0 | 1.525 | 0.18 | 138 | 1.1 | Comparison |
| 108 | 8.0 | 30.0 | 30.0 | 14.0 | 1.525 | 0.11 | 70 | 1.2 | Comparison |
| 109 | 6.0 | 6.0 | 16.0 | 14.0 | 1.525 | 0.16 | 63 | 2.0 | Comparison |
| 110 | 20.0 | 4.0 | 16.0 | 13.0 | 1.525 | 0.22 | 125 | 1.9 | Comparison |
| 111 | 8.0 | 12.0 | 16.0 | 14.0 | 1.525 | 0.26 | 75 | 5.0 | Comparison |
| 112 | 8.0 | 3.0 | 9.0 | 14.0 | 1.525 | 0.14 | 120 | 1.1 | Comparison |

TABLE 1-continued

| Sample No. | The Largest Angle of Distribution of Angle of Inclination (°) | Surface Haze (%) | Internal Haze (%) | Average Reflectance (%) | Denseness of black | Antiglare Property | Resistance to Brittleness | Remarks |
|---|---|---|---|---|---|---|---|---|
| 101 | 0.4 | 4.0 | 22 | 1.3 | A | B | B | Invention |
| 102 | 0.6 | 9.0 | 20 | 1.3 | B | A | B | Invention |
| 103 | 0.2 | 3.0 | 30 | 1.3 | A | C | D | Comparison |
| 104 | 1.0 | 13.0 | 11 | 1.6 | D | A | A | Comparison |
| 105 | 0.8 | 4.0 | 21 | 2.3 | A | B | B | Invention |
| 106 | 0.2 | 2.7 | 16 | 1.8 | A | B | B | Invention |
| 107 | 0.2 | 5.1 | 15 | 2.3 | B | B | B | Comparison |
| 108 | 0.2 | 2.2 | 11 | 1.5 | A | C | B | Comparison |
| 109 | 0.2 | 2.3 | 18 | 1.6 | A | C | B | Comparison |
| 110 | 0.3 | 11.0 | 8 | 1.7 | D | A | B | Comparison |
| 111 | 1.2 | 10.0 | 9 | 2.3 | D | A | B | Comparison |
| 112 | 0.2 | 5.0 | 25 | 1.6 | A | B | B | Comparison |

From the results shown in Table 1, the following matters are apparent. The optical films in the invention have optical performances (average reflectance, denseness of black, an antiglare property) in desired ranges as the antiglare antireflection films. Also, it can be seen that the optical films in the invention are excellent in resistance to brittleness. In particular, Sample 106 of the invention is a film further better in denseness of black as compared with Samples 101 and 105 of the invention.

Example 2

A polarizing film is manufactured by the adsorption of iodide onto polyvinyl alcohol and stretching. Both surfaces of the polarizing film are adhered to a triacetyl cellulose film (TAC-TD80U, manufactured by Fuji Photo Film Co., Ltd.) having a thickness of 80 μm immersed in an NaOH aqueous solution (1.5 mol/liter) at 55° C. for 2 minutes, neutralized and washed, and to the sample (subjected to saponification treatment) in Example 1, and the adhered sample is protected, and a polarizing plate is manufactured. The thus-manufactured polarizing plate is replaced with the polarizing plate on the viewing side of the liquid crystal display of a notebook-sized personal computer mounting a transmission type TN liquid crystal display (having D-BEF (manufactured by Sumitomo 3M Limited), which is a polarization separating film having a polarization selecting layer, between the backlight and a liquid crystal cell), so that the antiglare layer or the low refractive index layer is the outermost surface. A background is hardly mirrored and a display having very high display quality can be obtained.

Example 3

An optically compensatory film (Wide View Film Ace, manufactured by Fuji Photo Film Co., Ltd.) is used as the protective film on the liquid crystal cell side of the polarizing plate on the viewing side of a transmittance type TN liquid crystal cell stuck with the film of the invention in Example 1, and as the protective film on the liquid crystal cell side of the polarizing plate on the backlight side. The film samples in the invention are excellent in contrast in a bright room, the viewing angles of top and bottom and left and right are very wide, and extremely excellent in visibility, thus liquid crystal displays having high display quality can be obtained.

A polarizing plate using Comparative Sample 103 is high in black luminance in dark field, and display contrast is lowered as compared with the polarizing plates using Samples 101 and 102 of the invention and Comparative Sample 104.

The light of a three-band fluorescent lamp is mirrored on the display, and the edge part of the mirrored image of fluorescent lamp is visually evaluated according to the following criteria.
A: Rainbow color irregularity is not generated on the slightly mirrored edge part of the light of the fluorescent lamp.
B: Rainbow color irregularity is slightly generated.
C: Rainbow color irregularity is generated.

The results of evaluations of each sample are shown in Table 2 below.

Example 4

Modification of Liquid Crystal TV

To forcedly generate irregularity attributable to the image display part, a liquid crystal TV is modified as described below and evaluated. A liquid crystal TV (Model LC-32GS10, manufactured by Sharp Corporation) is disassembled, and the optical sheets between the backlight and the liquid crystal panel are all removed exclusive of the diffusion plate. Prism sheet BEF2 (manufactured by Sumitomo 3M Limited) is arranged there so that the groove direction is horizontal direction to the image plane, and TV is reassembled. In the next place, only the surface films of the polarizing plates (the upper and lower polarizing plates) on the viewing side are carefully peeled off, and the sample film in Example 1 is stuck with an adhesive. In the state of gray solid display on the liquid crystal TV (gradation: 126/255) the degree of display irregularity of striped Moiré is visually evaluated according to the following criteria.
A: Moiré is not disagreeable at all (the ratio of brightness of bright part/dark part is less than 0.5%)
B: Moiré is a little disagreeable (the ratio of brightness of bright part/dark part is from 0.5 to 2.5%)
C: Moiré is disagreeable (the ratio of brightness of bright part/dark part is less than 2.5% or more)

The results of evaluation are shown in Table 2.

TABLE 2

| Sample No. | Edge Part of the Image of Mirrored Fluorescent Lamp | Display Irregularity of Striped Moiré | Remarks |
|---|---|---|---|
| 101 | A | A | Invention |
| 102 | A | B | Invention |
| 103 | A | A | Comparison |
| 104 | C | C | Comparison |
| 105 | A | A | Invention |
| 106 | A | A | Invention |

TABLE 2-continued

| Sample No. | Edge Part of the Image of Mirrored Fluorescent Lamp | Display Irregularity of Striped Moiré | Remarks |
|---|---|---|---|
| 107 | B | B | Comparison |
| 108 | B | B | Comparison |
| 109 | C | C | Comparison |
| 110 | A | B | Comparison |
| 111 | C | C | Comparison |
| 112 | C | C | Comparison |

From the results shown in Table 2, the following matters are apparent. When the light of a three-band fluorescent lamp is mirrored on the display in a dark room, the optical films of the invention do not generate rainbow color irregularity on the mirrored edge part of the light of the fluorescent lamp, and irregularity attributable to the image display part is not disagreeable.

Example 5

When each of the sample films in Example 1 is stuck on the glass plate of the surface of an organic EL display with an adhesive, reflection on the glass surface is restrained, and a display free of irregularity having high visibility is obtained.

Example 6

A polarizing plate having the optical film in Example 1 on one side is manufactured. A λ/4 plate is stuck on the side of the polarizing plate opposite to the side having the optical film of the invention, and the polarizing plate is adhered to a glass plate of the surface of an organic EL display so that the optical film of the invention is outermost surface. The surface reflection and the reflection from the inside of the surface glass are cut, and a display free of irregularity having very high visibility is obtained.

The invention can provide an antiglare film excellent in an antiglare property, denseness of black, and resistance to brittleness with good reproducibility. The invention can also provide a polarizing plate excellent in an antiglare property, denseness of black, and resistance to brittleness, and an image display hardly accompanied by the rainbow color irregularity even when the light of a three-band fluorescent lamp is mirrored on the surface of the display.

The entire disclosure of each and every foreign patent application from which the benefit of foreign priority has been claimed in the present application is incorporated herein by reference, as if fully set forth.

What is claimed is:

1. An optical film comprising:
   a transparent support; and
   an antiglare layer that comprises a light-transmitting resin and at least two kinds of light-transmitting particles, wherein
   the antiglare layer has a thickness of from 10 μm to 15 μm,
   each kind of the at least two kinds of light transmitting particles has an average particle size of from 7 μm to 15 μm,
   each kind of the at least two kinds of light transmitting particles has a refractive index different from a refractive index of the light-transmitting resin by from 0.001 to 0.050 in absolute value, and
   a total amount of the at least two kinds of light-transmitting particles are from 15 to 40 mass % based on all solid contents in the antiglare layer, wherein the at least two kinds of light-transmitting particles comprise:
   a light-transmitting particle A having a refractive index different from the refractive index of the light-transmitting resin by from 0.010 to 0.050; and
   a light-transmitting particle B having a refractive index different from the refractive index of the light-transmitting resin by from −0.050 to −0.010.

2. The optical film as claimed in claim 1, wherein the refractive indices of the at least two kinds of light-transmitting particles are different from each other.

3. The optical film as claimed in claim 1, wherein an average particle size of light-transmitting particle A is substantially the same as an average particle size of light-transmitting particle B.

4. The optical film as claimed in l claim 1, wherein an average particle size of the light-transmitting particle A is different from an average particle size of the light-transmitting particle B.

5. The optical film as claimed in claim 1, wherein a mass ratio of the light-transmitting particle A to the light-transmitting particle B is from 25/75 to 75/25.

6. The optical film as claimed in claim 2, wherein a mass ratio of the light-transmitting particle A to the light-transmitting particle B is from 25/75 to 75/25.

7. The optical film as claimed in claim 1, further comprising:
   a layer having a refractive index lower than a refractive index of the antiglare layer.

8. The optical film as claimed in claim 1, wherein a haze value attributable to surface scattering is from 0.2% to 10%.

9. The optical film as claimed in claim 1, wherein a haze value attributable to internal scattering is from 10% to 35%.

10. The optical film as claimed in claim 1, wherein an integrated reflectance is 3.0% or less.

11. The optical film as claimed in claim 1, wherein a centerline average roughness Ra is from 0.05 to 0.25 μm, and an average space of ruggedness Sm is from 50 to 350 μm.

12. The optical film as claimed in claim 1, wherein an average inclination angle Sa is 0.50 or more and 3.00 or less.

13. The optical film as claimed in claim 1, wherein the largest angle of distribution of inclination angle is 0.30 or less.

14. A polarizing plate comprising:
   a polarizing film; and
   two protective films that protect both surfaces of the polarizing film, wherein at least one of the two protective films is the optical film as claimed in claim 1.

15. An image display comprising:
   the optical film as claimed in claim 1.

* * * * *